United States Patent
Buckley et al.

(10) Patent No.: US 11,551,636 B1
(45) Date of Patent: Jan. 10, 2023

(54) CONSTRAINED RENDERING

(71) Applicant: Meta Platforms Technologies, LLC, Menlo Park, CA (US)

(72) Inventors: Edward Buckley, Redmond, WA (US); Pin-Chieh Huang, Champaign, IL (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 91 days.

(21) Appl. No.: 17/129,722

(22) Filed: Dec. 21, 2020

Related U.S. Application Data

(60) Provisional application No. 63/084,463, filed on Sep. 28, 2020.

(51) Int. Cl.
*G09G 5/14* (2006.01)
*G09G 5/02* (2006.01)

(52) U.S. Cl.
CPC ............... *G09G 5/02* (2013.01); *G09G 5/14* (2013.01); *G09G 2320/0242* (2013.01); *G09G 2320/0266* (2013.01)

(58) Field of Classification Search
CPC .... G09G 5/02; G09G 5/14; G09G 2320/0242; G09G 2320/0266
See application file for complete search history.

(56) References Cited

U.S. PATENT DOCUMENTS

| | | | |
|---|---|---|---|
| 6,496,186 B1* | 12/2002 | Deering | G06T 11/40 345/611 |
| 7,460,133 B2 | 12/2008 | Messing et al. | |
| 2005/0169551 A1* | 8/2005 | Messing | G09G 3/2003 382/260 |
| 2005/0238228 A1* | 10/2005 | Platt | G09G 5/005 382/162 |
| 2007/0273626 A1* | 11/2007 | Kerofsky | G09G 3/3607 345/87 |
| 2010/0118045 A1* | 5/2010 | Brown Elliott | H04N 13/302 345/589 |

(Continued)

OTHER PUBLICATIONS

Chae, et al., Subpixel Rendering for the PenTile Display Based on the Human Visual System, IEEE Transactions on Consumer Electronics, 63(4), 401-409, Nov. 4, 2017.

(Continued)

*Primary Examiner* — Terrell M Robinson
(74) *Attorney, Agent, or Firm* — Baker Botts L.L.P.

(57) ABSTRACT

In one embodiment, a computing system may determine a group of subpixels, that are associated with different color channels, within a display region of a display. The system may determine a micro-pixel corresponding to a basic unit shape configured to evenly divide the display region and each subpixel. The system may represent the display region as a group of micro-pixels and each subpixel as a combination of one or more micro-pixels in the group of micro-pixels. The system may determine a constraint for each color channel of the display region based on the group of micro-pixels. The constraint may constrain the micro-pixels associated with a same subpixel to have a same color value. The system may generate, based on an optimization process using the constraint, a filter for the display region. The filter may be configured to adjust image pixel values to be displayed by the group of subpixels.

20 Claims, 23 Drawing Sheets

400B

(56) References Cited

U.S. PATENT DOCUMENTS

| | | | |
|---|---|---|---|
| 2010/0149204 A1* | 6/2010 | Han | G09G 5/02 |
| | | | 345/589 |
| 2010/0289835 A1* | 11/2010 | Holub | H04N 9/3194 |
| | | | 345/690 |
| 2012/0287143 A1* | 11/2012 | Brown Elliott | G09G 3/3413 |
| | | | 345/589 |
| 2022/0102583 A1 | 3/2022 | Baumheinrich et al. | |

OTHER PUBLICATIONS

Daly, 47.3: Analysis of Subtriad Addressing Algorithms by Visual System Models, In SID Symposium Digest of Technical Papers, 4 pages, 2001.

Engelhardt, et al., Low-Cost Subpixel Rendering for Diverse Displays, In Computer Graphics Forum, 10 pages, 2013.

Fang, et al., Novel 2-D MMSE Subpixel-Based Image Down-Sampling, IEEE transactions on circuits and systems for video technology, 22(5), 740-753, May 5, 2012.

Johnson, et al., A top down description of S-CIELAB and CIEDE2000, Color Research and Application, 28(6):425-435, Dec. 2003.

Klompenhouwer, et al., Subpixel Image Scaling for Color-Matrix Displays. Journal of the Society for Information Display, 13 pages, Jun. 18, 2012.

Messing, et al., Improved Display Resolution of Subsampled Colour Images Using Subpixel Addressing, IEEE, pp. 625-628, 2002.

Messing, et al., Subpixel Rendering on Non-Striped Colour Matrix Displays, In Proceedings 2003 International Conference on Image Processing, IEEE, pp. 949-953, 2003.

Messing, et al., Using Optimal Rendering to Visually Mask Defective Subpixels, In Human Vision and Electronic Imaging XI, 605700, 13 pages, Feb. 2006.

Platt, Optimal Filtering for Patterned Displays, IEEE Signal Processing Letters, 8 pages, 2000.

* cited by examiner

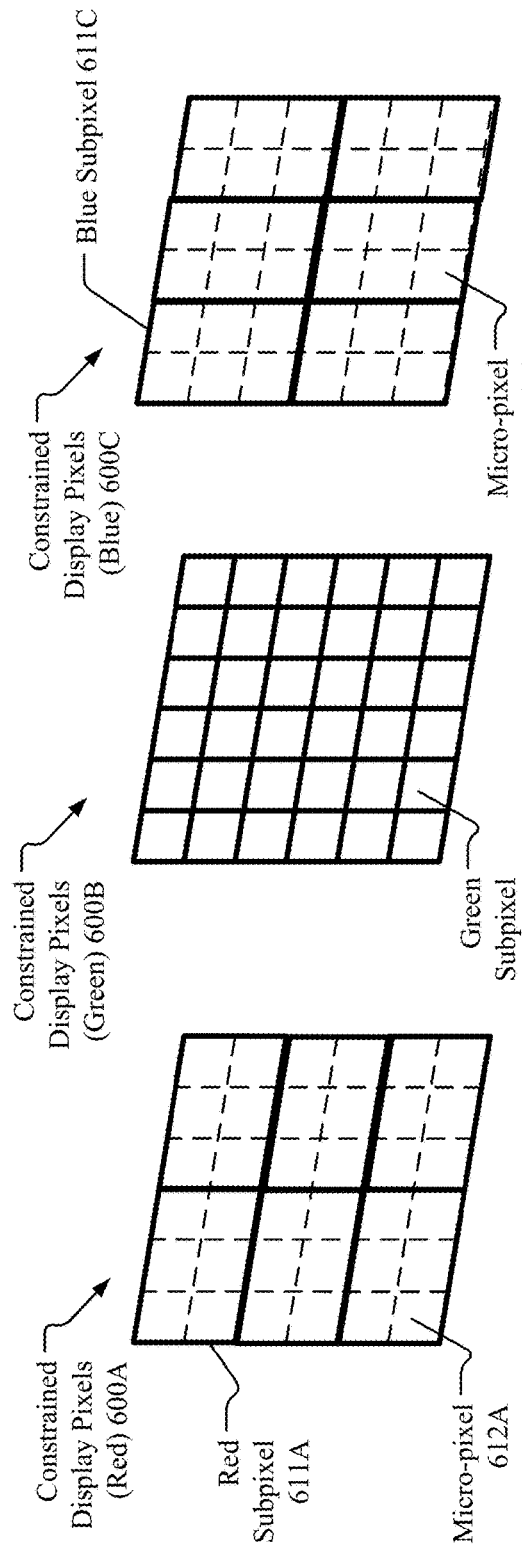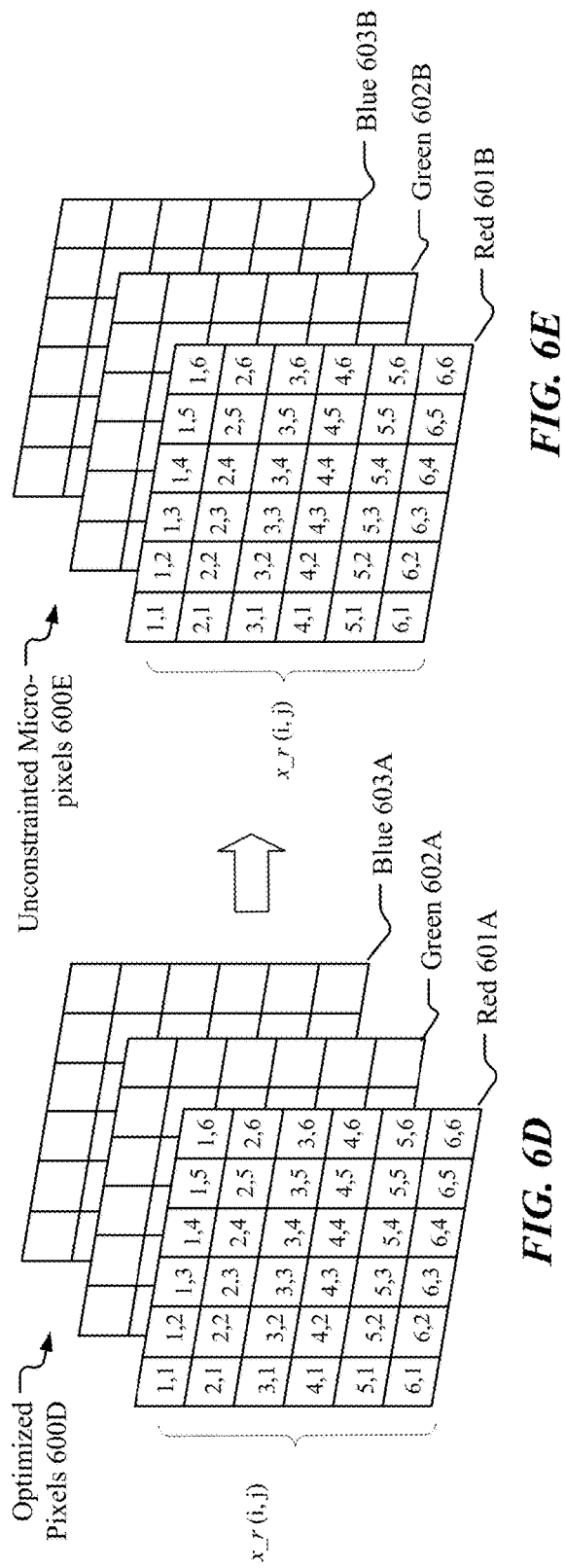

Equation (13) for Red Color Channel $$S^r = \begin{bmatrix} s^r & \\ & s^r \end{bmatrix}, \text{ where } s^r = \frac{1}{6}\begin{bmatrix} U^r & U^r & U^r \\ U^r & U^r & U^r \\ U^r & U^r & U^r \end{bmatrix} \text{ and } U^r = \begin{bmatrix} 1 & 1 & & & & \\ 1 & 1 & & & & \\ & & 1 & 1 & & \\ & & 1 & 1 & & \\ & & & & 1 & 1 \\ & & & & 1 & 1 \end{bmatrix}$$

$Ur$ 811

$Sr$ 812

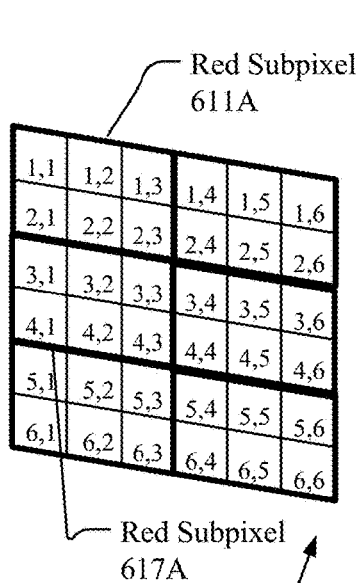

Red Subpixel 611A

Red Subpixel 617A

Constrained Display Pixels (Red) 600C $\frac{1}{6} \times$

```
110000 110000 110000 000000 000000 000000
110000 110000 110000 000000 000000 000000
001100 001100 001100 000000 000000 000000
001100 001100 001100 000000 000000 000000
000011 000011 000011 000000 000000 000000
000011 000011 000011 000000 000000 000000
110000 110000 110000 000000 000000 000000
110000 110000 110000 000000 000000 000000
001100 001100 001100 000000 000000 000000
001100 001100 001100 000000 000000 000000
000011 000011 000011 000000 000000 000000
000011 000011 000011 000000 000000 000000
110000 110000 110000 000000 000000 000000
110000 110000 110000 000000 000000 000000
001100 001100 001100 000000 000000 000000
001100 001100 001100 000000 000000 000000
000011 000011 000011 000000 000000 000000
000011 000011 000011 000000 000000 000000
000000 000000 000000 110000 110000 110000
000000 000000 000000 110000 110000 110000
000000 000000 000000 001100 001100 001100
000000 000000 000000 001100 001100 001100
000000 000000 000000 000011 000011 000011
000000 000000 000000 000011 000011 000011
000000 000000 000000 110000 110000 110000
000000 000000 000000 110000 110000 110000
000000 000000 000000 001100 001100 001100
000000 000000 000000 001100 001100 001100
000000 000000 000000 000011 000011 000011
000000 000000 000000 000011 000011 000011
000000 000000 000000 110000 110000 110000
000000 000000 000000 110000 110000 110000
000000 000000 000000 001100 001100 001100
000000 000000 000000 001100 001100 001100
000000 000000 000000 000011 000011 000011
000000 000000 000000 000011 000011 000011
```

Red Color Channel Constraint Matrix 820 (36 × 36)

Equation (15) for Blue Color Channel $$S^b = \begin{bmatrix} s^b & & \\ & s^b & \\ & & s^b \end{bmatrix}, \text{ where } s^b = \frac{1}{6}\begin{bmatrix} U^b & U^b \\ U^b & U^b \end{bmatrix} \text{ and } U^b = \begin{bmatrix} 1 & 1 & 1 & & & \\ 1 & 1 & 1 & & & \\ 1 & 1 & 1 & & & \\ & & & 1 & 1 & 1 \\ & & & 1 & 1 & 1 \\ & & & 1 & 1 & 1 \end{bmatrix}$$

$U\_b$ 847

$S\_b$ 842

Blue Macro Pixel 611C

| 1,1 | 1,2 | 1,3 | 1,4 | 1,5 | 1,6 |
| 2,1 | 2,2 | 2,3 | 2,4 | 2,5 | 2,6 |
| 3,1 | 3,2 | 3,3 | 3,4 | 3,5 | 3,6 |
| 4,1 | 4,2 | 4,3 | 4,4 | 4,5 | 4,6 |
| 5,1 | 5,2 | 5,3 | 5,4 | 5,5 | 5,6 |
| 6,1 | 6,2 | 6,3 | 6,4 | 6,5 | 6,6 |

Blue Macro Pixel 617C

Constrained Display Pixels (Blue) 600D $S\_b$ 842

Blue Color Channel Constraint Matrix 840 (36 × 36)

$\frac{1}{6} \times$

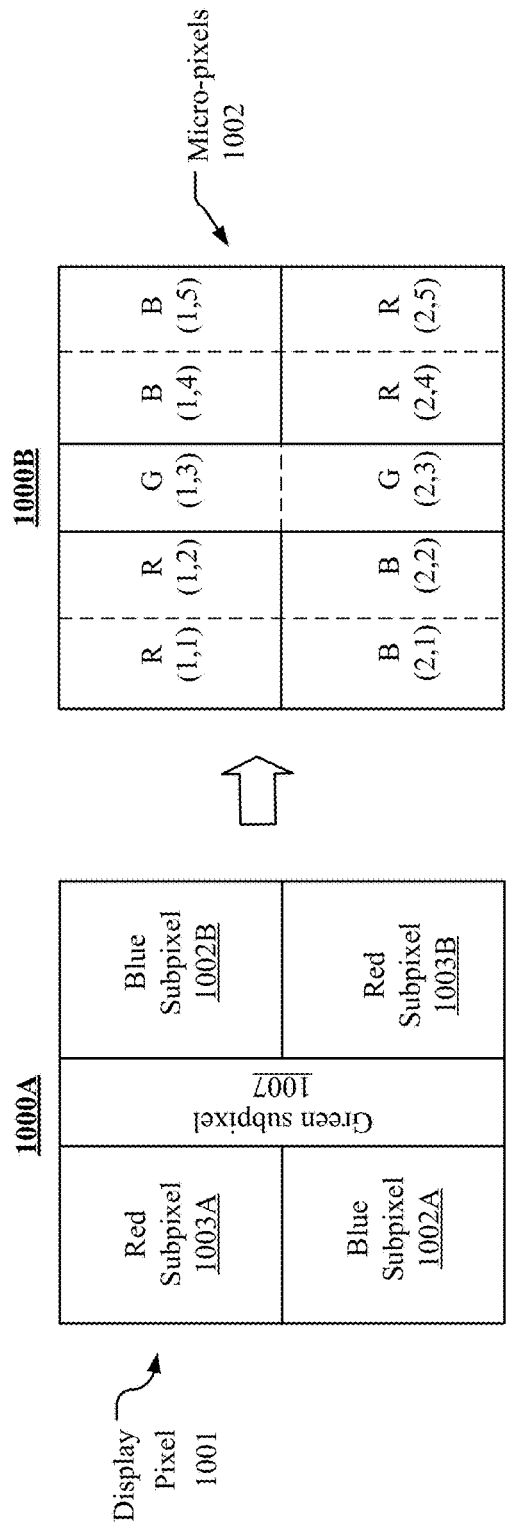
FIG. 10A
FIG. 10B
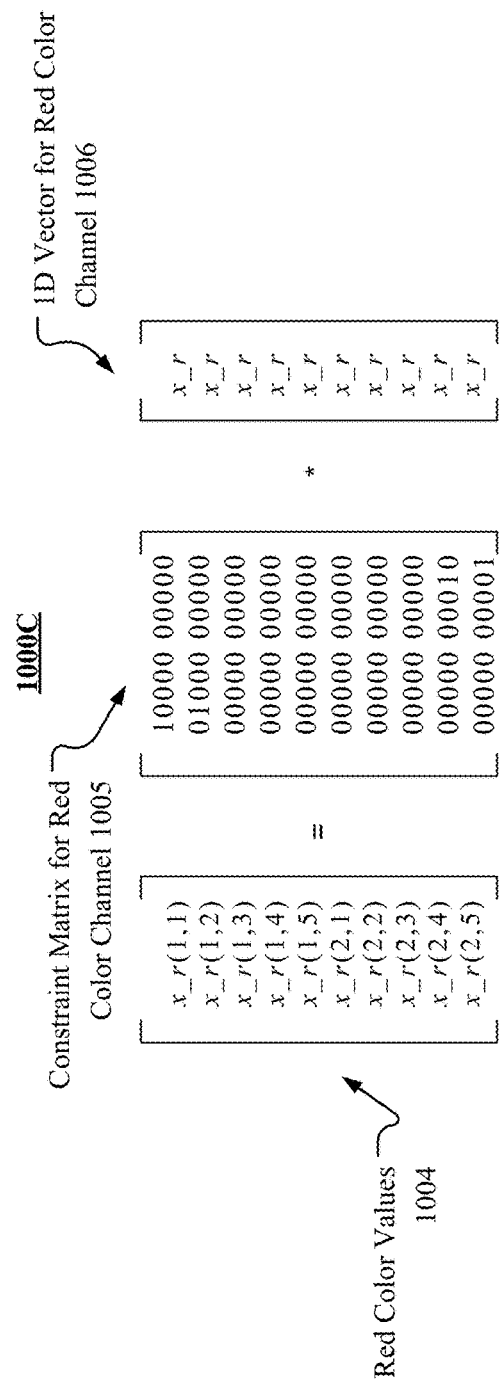
FIG. 10C

1000D

$$
\begin{bmatrix} x\_g(1,1) \\ x\_g(1,2) \\ x\_g(1,3) \\ x\_g(1,4) \\ x\_g(1,5) \\ x\_g(2,1) \\ x\_g(2,2) \\ x\_g(2,3) \\ x\_g(2,4) \\ x\_g(2,5) \end{bmatrix}
=
\begin{bmatrix} 00000\ 00000 \\ 00000\ 00000 \\ 00100\ 00000 \\ 00000\ 00000 \\ 00000\ 00000 \\ 00000\ 00000 \\ 00000\ 00000 \\ 00000\ 00100 \\ 00000\ 00000 \\ 00000\ 00000 \end{bmatrix}
*
\begin{bmatrix} x\_g \\ x\_g \\ x\_g \\ x\_g \\ x\_g \\ x\_g \\ x\_g \\ x\_g \end{bmatrix}
$$

Green Color Values 1011 → (Constraint Matrix for Red Color Channel 1012) → Vector with Duplicated Red Color Component 1013

$$
\begin{bmatrix} x\_b(1,1) \\ x\_b(1,2) \\ x\_b(1,3) \\ x\_b(1,4) \\ x\_b(1,5) \\ x\_b(2,1) \\ x\_b(2,2) \\ x\_b(2,3) \\ x\_b(2,4) \\ x\_b(2,5) \end{bmatrix}
=
\begin{bmatrix} 00000\ 00000 \\ 00000\ 00000 \\ 00000\ 00000 \\ 00010\ 00000 \\ 00001\ 00000 \\ 00000\ 10000 \\ 00000\ 01000 \\ 00000\ 00000 \\ 00000\ 00000 \\ 00000\ 00000 \end{bmatrix}
*
\begin{bmatrix} x\_b \\ x\_b \\ x\_b \\ x\_b \\ x\_b \\ x\_b \\ x\_b \\ x\_b \end{bmatrix}
$$

Blue Color Values 1021 → (Constraint Matrix for Red Color Channel 1022) → Vector with Duplicated Red Color Component 1023

FIG. 10E

CONSTRAINED RENDERING

PRIORITY

This application claims the benefit under 35 U.S.C. § 119(e) of U.S. Provisional Patent Application No. 63/084,463, filed 28 Sep. 2020, which is incorporated herein by reference.

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to a constrained rendering framework to eliminate or reduce the artifacts in the displayed images caused by the difference between subpixels of different color channels. The system may determine a filter which may be a 2D matrix that can be used to calculate the optimized pixel values based on the original image pixel values. Each optimized pixel value of a particular color channel may depend on corresponding original pixel values of all three color channels. The system may determine a constraint matrix S for each color channel of RGB color channels based on the sizes, shapes, and layouts of the subpixels of that color channel. The constraint matrix S once applied to the optimized pixel values may allow the micro-pixels that are included in the same subpixel to have the same pixel values. To optimize the filer, the system may first use the filter with initial filter values or current filter value to generate optimized pixel values $\tilde{x}$ based on the original image pixel values x. Then, the system may determine the target color values for the subpixels based on the constraint matrix S and the optimized pixel values $\tilde{x}$. Then, the system may compare the target color values $S\tilde{x}$ to the original image pixel values x and determine their difference represented by a difference matrix ($S\tilde{x}-x$). After that, the system may transfer that difference matrix ($S\tilde{x}-x$) from the RGB space to the opponent color space using the Fourier transform F, the opponent color space transform C, and a 2D contrast sensitivity function W. The optimization process may be represented by $\varepsilon(\tilde{x})=\|W\,C\,\mathcal{F}\{S\tilde{x}-x\}\|^2$, where $\varepsilon(\tilde{x})$ is the sum of the $\ell$2-norm for each color channel. The system may optimize the filter by finding the filter values that can minimize the $\varepsilon(\tilde{x})$ As a result, the filter with the optimized filter values may allow the displayed images to have minimum mean-squared perceived error ($\varepsilon$) in the opponent color space as perceived by the user.

The system may generate an optimization and constraint filter which incorporates both the optimization filter and the constraint matrix. At run time, the system may first access an image to be displayed to determine the image pixel values. Then, the system may determine the target color values that will be outputted to the display subpixels by applying the optimization and constrain filter to the image pixel values. The target color values that need to be outputted to the display pixels may have the same value for the micro-pixels within the same subpixel. After that, the system may output the target color values to the corresponding display pixels for display. As a result, the displayed image may eliminate or reduce the artifacts caused by the difference between the display subpixels (e.g., difference in size, shape, or/and layout) of different color channels, and have better image quality.

In particular embodiments, the display system may be single-panel display which includes all color matrix on a single display panel or a multi-panel display which includes color matrixes of different color channels in separate physical display panels. In particular embodiments, the display pixels of the different color channels may be included in different display panels that are misaligned to each other due to manufacture defect. In addition to the artifacts caused by the difference between subpixel sizes, shapes, and layouts, the displayed image may have artifacts caused by this misalignment of display panels. To mitigate these artifacts, the system may generate the constraint matrix according to the magnitudes and directions of these misalignments. For example, the constraint matrix for each particular color channel may specify the misalignment offsets and have shifted positions for its element values according to the magnitude and direction of the misalignment of that particular color channel. As a result, the constraint matrix once applied to the optimized pixel values may correctly determine the target color values based on the optimized pixel values. It is notable that the constraint matrixes may be generated based on all factors including subpixel sizes, shapes, layouts, or/and panel misalignments. The system may correct the artifacts caused by the subpixel difference and panel misalignments all at once.

In particular embodiment, the AR/VR system may display different color channels of an image sequentially in time. This is acceptable when the user's eye is stationary. However, when the user's eye moves while different color channels are being displayed sequentially in time, it will cause a temporal misalignment between different color channels and result in artifacts in the displayed image. To mitigate these artifacts, the system may generate the constraint matrix according to the magnitude and direction of the temporal misalignment caused by eye motion. Because the user's eye may move anytime, the system may dynamically determine constraint matrix and the corresponding optimization filter in real-time based on the eye tracking data of the user. The system may correctly determine the target color values base on the optimization filter and constraint matrixes. As a result, the displayed image may eliminate or reduce the artifacts caused by these temporal misalignments.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 6A-6E illustrate an example process to determine the constraint matrixes for particular subpixel layouts.
FIG. 8A illustrates an example constraint matrix for the red color channel with 2×3 subpixel layout.
FIG. 8C illustrates an example constraint matrix for the blue color channel with 3×2 subpixel layout.
FIG. 10A illustrates an example subpixel layout for a single-panel display.

FIG. 10B illustrates an example process for dividing the subpixels of RGB into basic unit sizes corresponding to micro-pixels.
FIGS. 10C-10E illustrate example constraint matrixes for the RGB subpixels of the display pixel.

DESCRIPTION OF EXAMPLE EMBODIMENTS

Figure 1A:
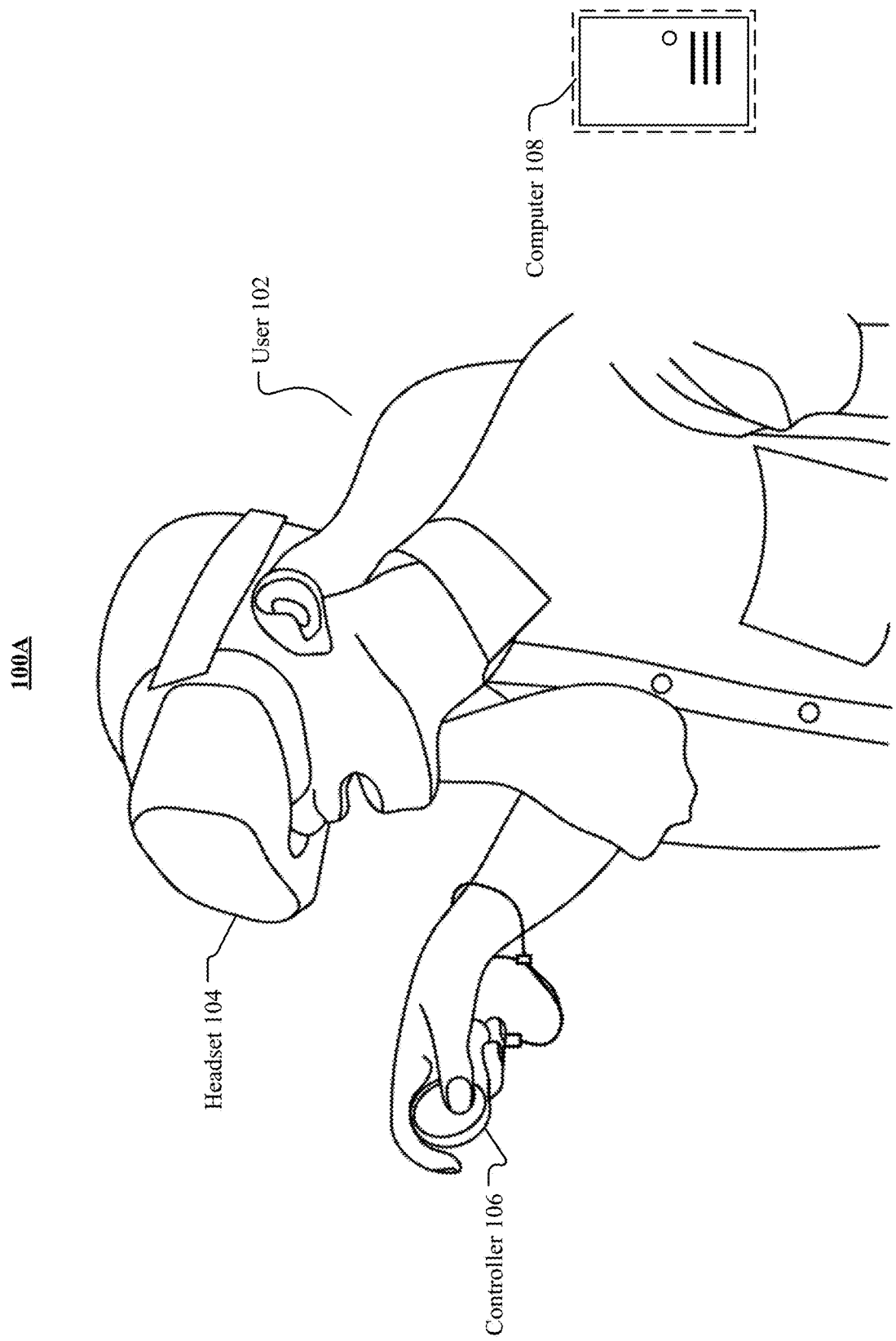
FIG. 1A illustrates an example artificial reality system.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
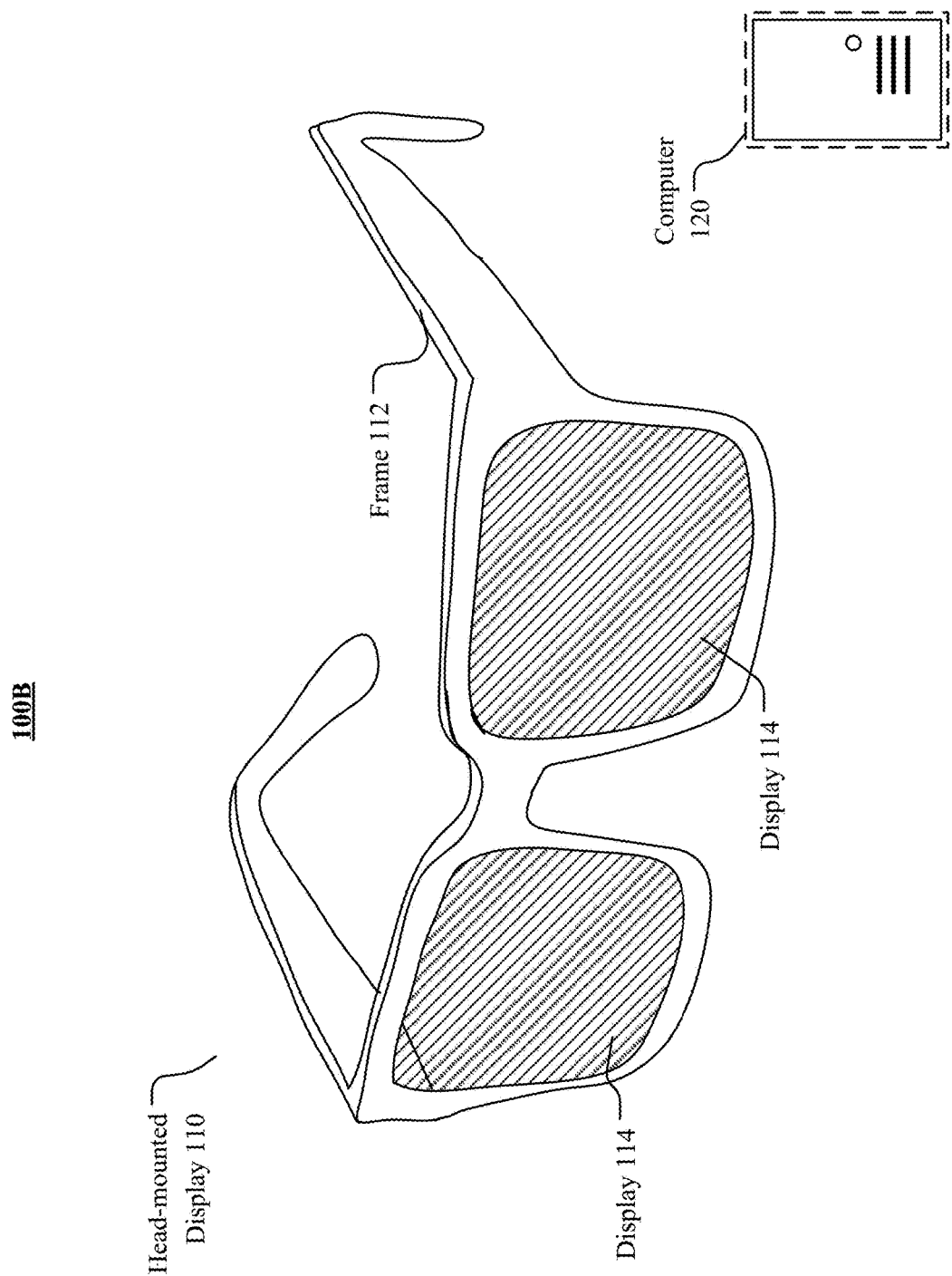
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
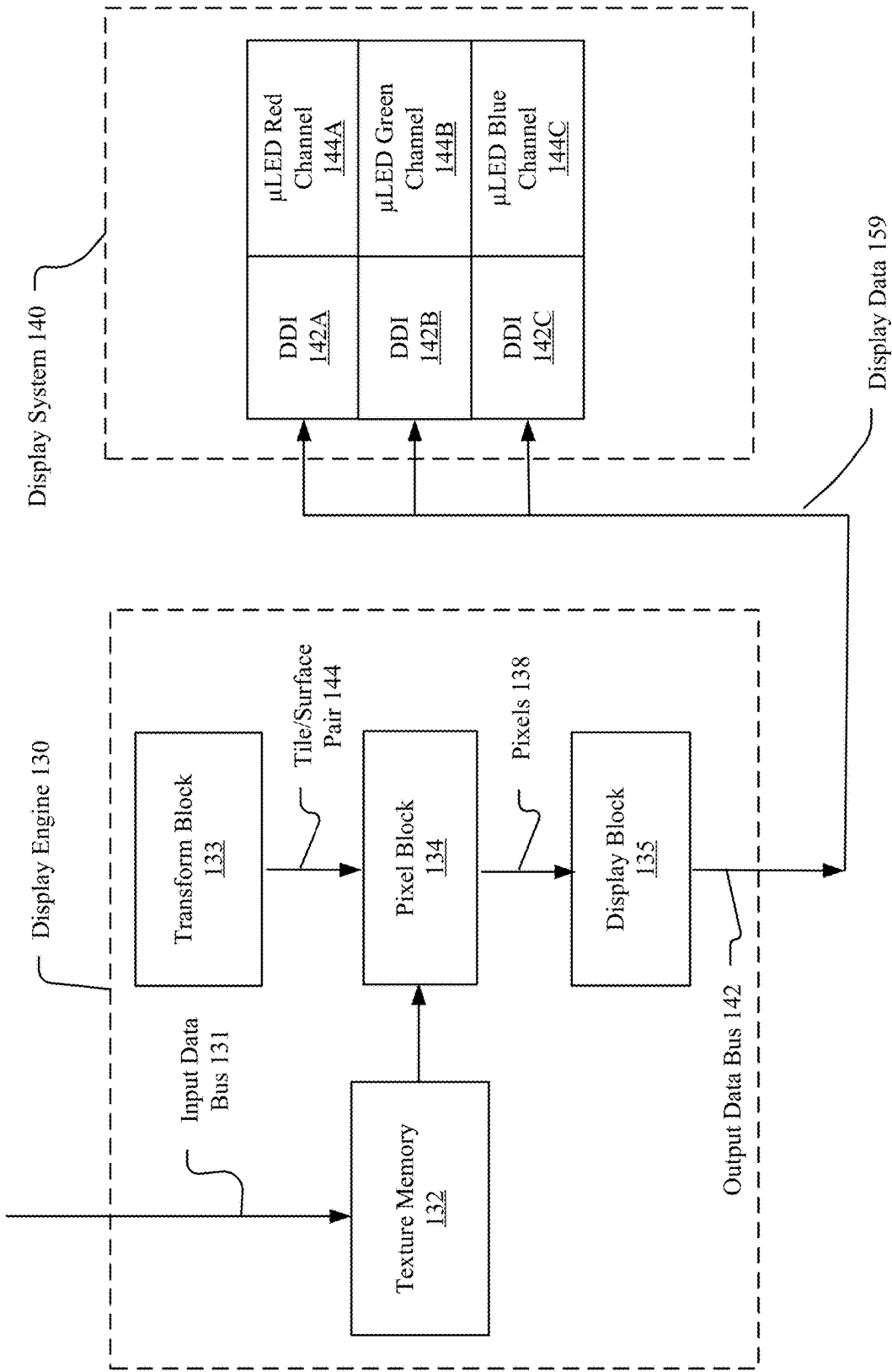
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded in to the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (μLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatio-temporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (DDIs) (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), display degradation, etc. U.S. patent application Ser. No. 16/998,860, entitled "Display Degradation Compensation," first named inventor "Edward Buckley," filed on 20 Aug. 2020, which discloses example systems, methods, and processes for display degradation compensation, is incorporated herein by reference.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

Figure 1D:
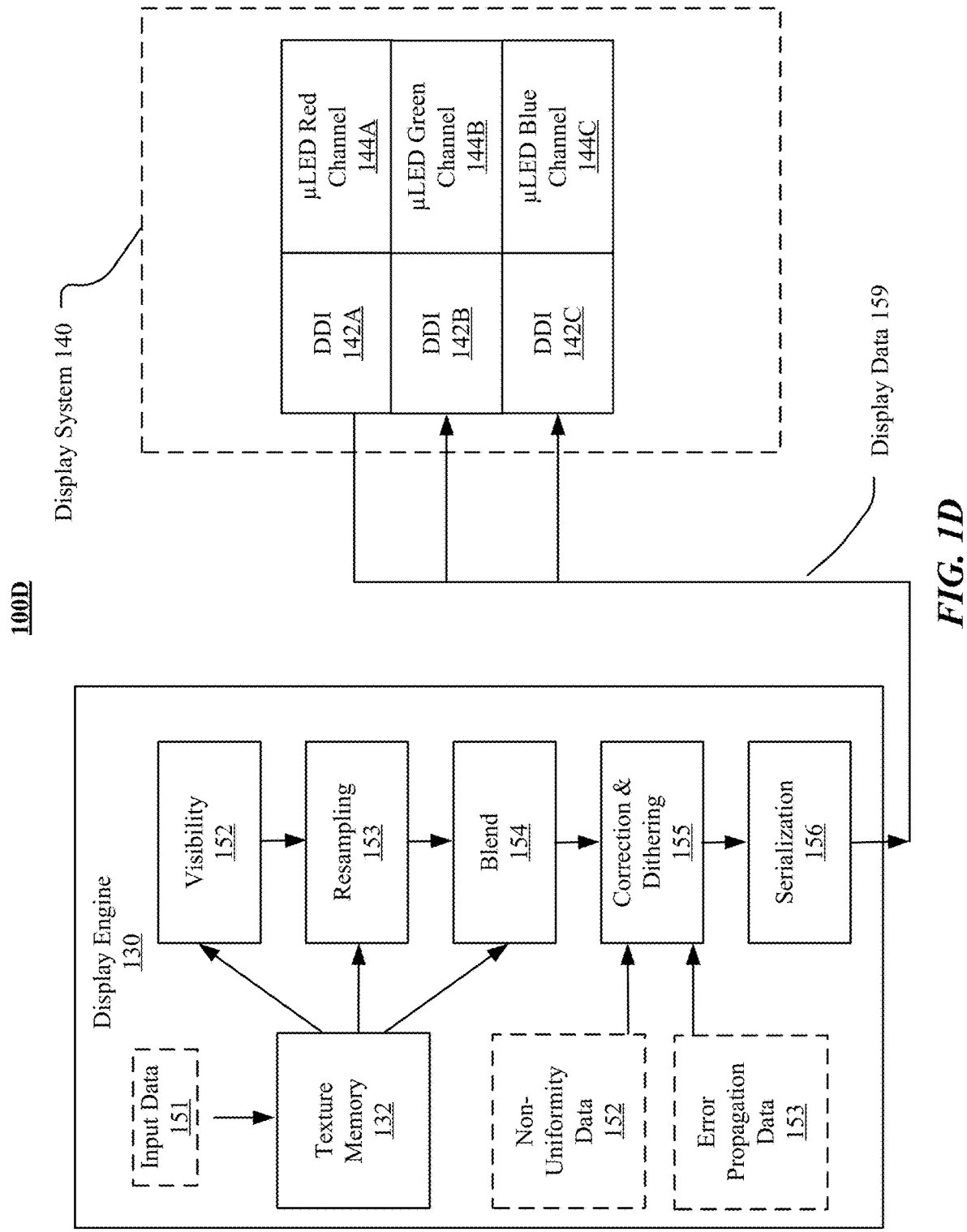
FIG. 1D illustrates an example graphic pipeline of the display engine for generating display image data.

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C) of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values, perform one or more dithering algorithms for dithering the quantization errors both spatially and temporally, serialize the pixel values for scanline output for the physical display, and generate the display data 159 suitable for the display system 140. The display engine 130 may send the display data 159 to the display system 140. In particular embodiments, the display system 140 may include three display driver ICs (e.g., 142A, 142B, 142C) for the pixels of the three color channels of RGB (e.g., 144A, 144B, 144C).

Figure 2A:
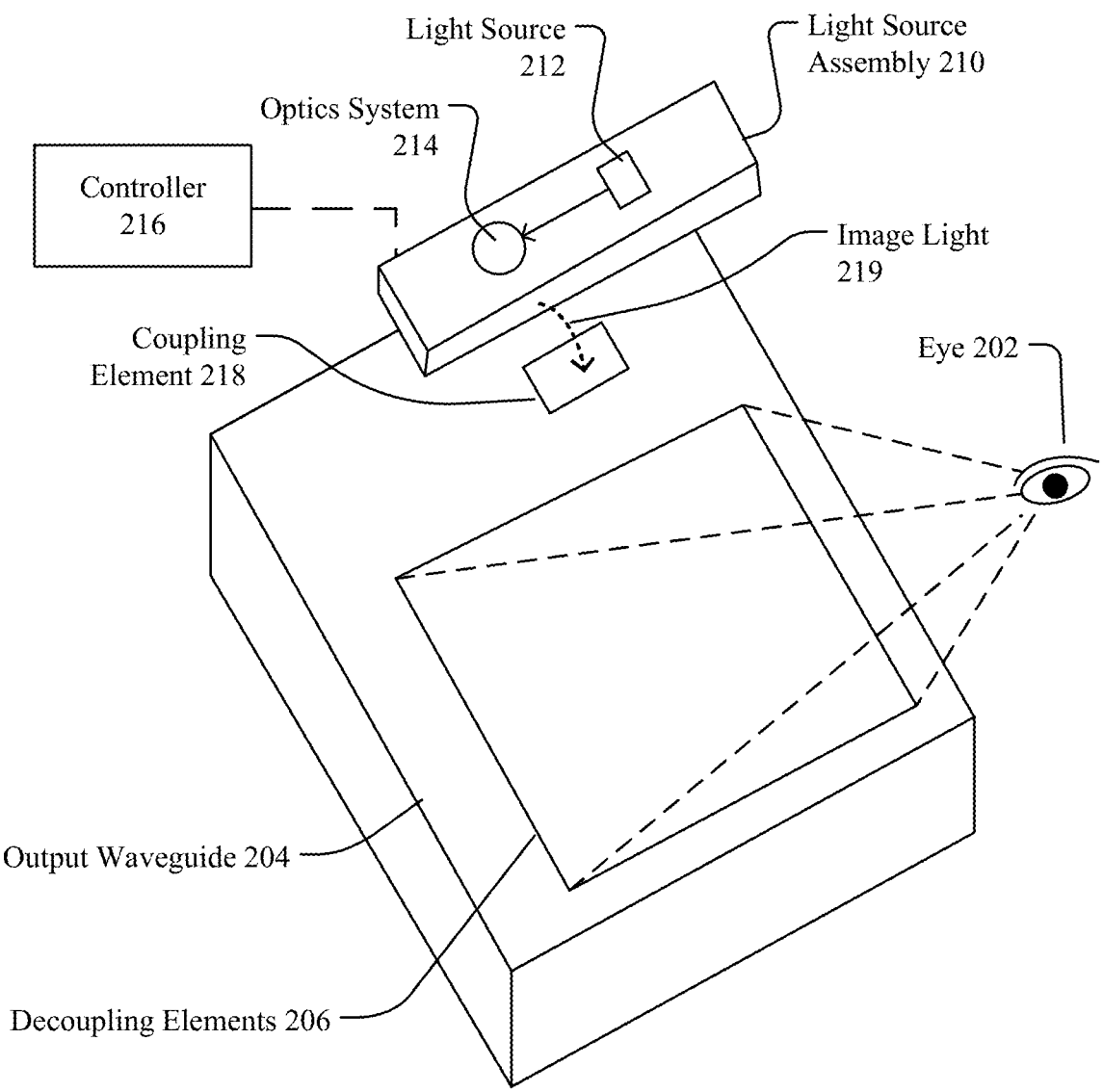
FIG. 2A illustrates an example scanning waveguide display.
Figure 3A:
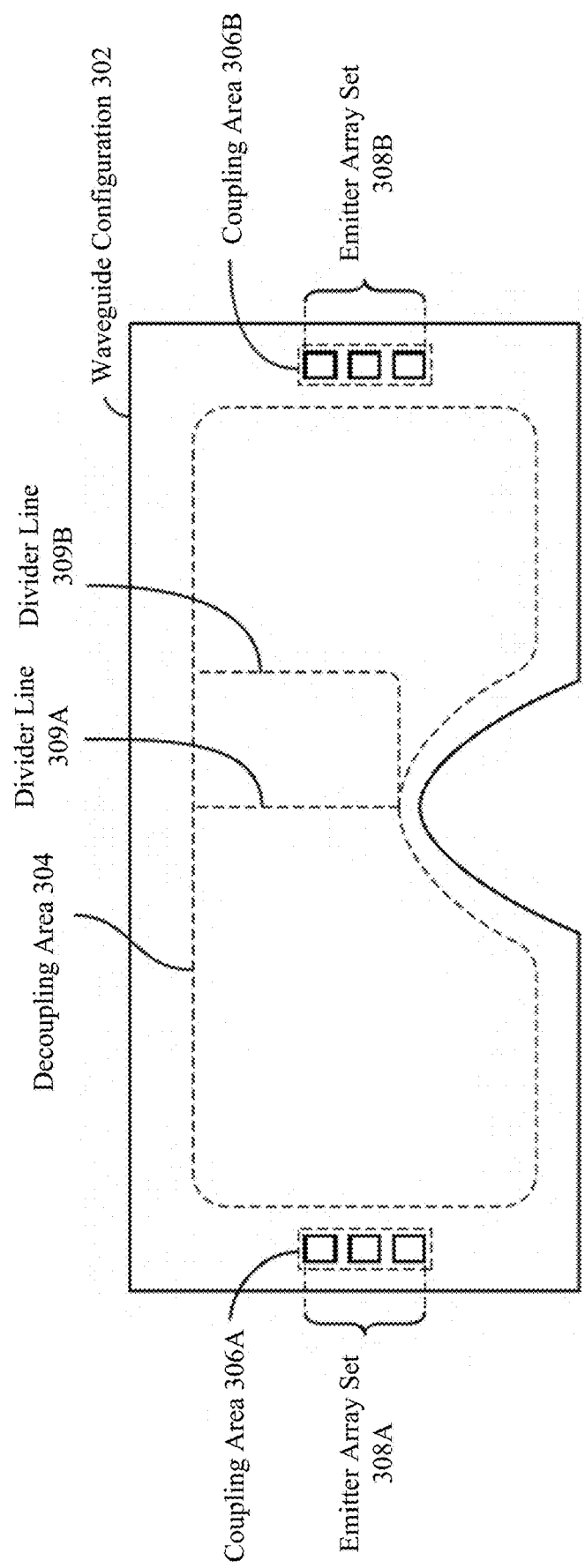
FIG. 3A illustrates an example 2D micro-LED waveguide display.

FIG. 2A illustrates an example scanning waveguide display 200A. In particular embodiments, the head-mounted display (HMD) of the AR/VR system may include a near eye display (NED) which may be a scanning waveguide display 200A. The scanning waveguide display 200A may include a light source assembly 210, an output waveguide 204, a controller 216, etc. The scanning waveguide display 200A may provide images for both eyes or for a single eye. For purposes of illustration, FIG. 3A shows the scanning waveguide display 200A associated with a single eye 202. Another scanning waveguide display (not shown) may provide image light to the other eye of the user and the two scanning waveguide displays may share one or more components or may be separated. The light source assembly 210 may include a light source 212 and an optics system 214. The light source 212 may include an optical component that could generate image light using an array of light emitters. The light source 212 may generate image light including, for example, but not limited to, red image light, blue image light, green image light, infra-red image light, etc. The optics system 214 may perform a number of optical processes or operations on the image light generated by the light source 212. The optical processes or operations performed by the optics systems 214 may include, for example, but are not limited to, light focusing, light combining, light conditioning, scanning, etc.

In particular embodiments, the optics system 214 may include a light combining assembly, a light conditioning assembly, a scanning mirror assembly, etc. The light source assembly 210 may generate and output an image light 219 to a coupling element 218 of the output waveguide 204. The output waveguide 204 may be an optical waveguide that could output image light to the user eye 202. The output waveguide 204 may receive the image light 219 at one or more coupling elements 218 and guide the received image light to one or more decoupling elements 206. The coupling element 218 may be, for example, but is not limited to, a diffraction grating, a holographic grating, any other suitable elements that can couple the image light 219 into the output waveguide 204, or a combination thereof. As an example and not by way of limitation, if the coupling element 350 is a diffraction grating, the pitch of the diffraction grating may be chosen to allow the total internal reflection to occur and the image light 219 to propagate internally toward the decoupling element 206. The pitch of the diffraction grating may be in the range of 300 nm to 600 nm. The decoupling element 206 may decouple the total internally reflected image light from the output waveguide 204. The decoupling element 206 may be, for example, but is not limited to, a diffraction grating, a holographic grating, any other suitable element that can decouple image light out of the output waveguide 204, or a combination thereof. As an example and not by way of limitation, if the decoupling element 206 is a diffraction grating, the pitch of the diffraction grating may be chosen to cause incident image light to exit the output waveguide 204. The orientation and position of the image light exiting from the output waveguide 204 may be controlled by changing the orientation and position of the image light 219 entering the coupling element 218. The pitch of the diffraction grating may be in the range of 300 nm to 600 nm.

In particular embodiments, the output waveguide 204 may be composed of one or more materials that can facilitate total internal reflection of the image light 219. The output waveguide 204 may be composed of one or more materials including, for example, but not limited to, silicon, plastic, glass, polymers, or some combination thereof. The output waveguide 204 may have a relatively small form factor. As an example and not by way of limitation, the output waveguide 204 may be approximately 50 mm wide along X-dimension, 30 mm long along Y-dimension and 0.5-1 mm thick along Z-dimension. The controller 216 may control the scanning operations of the light source assembly 210. The controller 216 may determine scanning instructions for the light source assembly 210 based at least on the one or more display instructions for rendering one or more images. The display instructions may include an image file (e.g., bitmap) and may be received from, for example, a console or computer of the AR/VR system. Scanning instructions may be used by the light source assembly 210 to generate image light 219. The scanning instructions may include, for example, but are not limited to, an image light source type (e.g., monochromatic source, polychromatic source), a scanning rate, a scanning apparatus orientation, one or more illumination parameters, or some combination thereof. The controller 216 may include a combination of hardware, software, firmware, or any suitable components supporting the functionality of the controller 216.

Figure 2B:
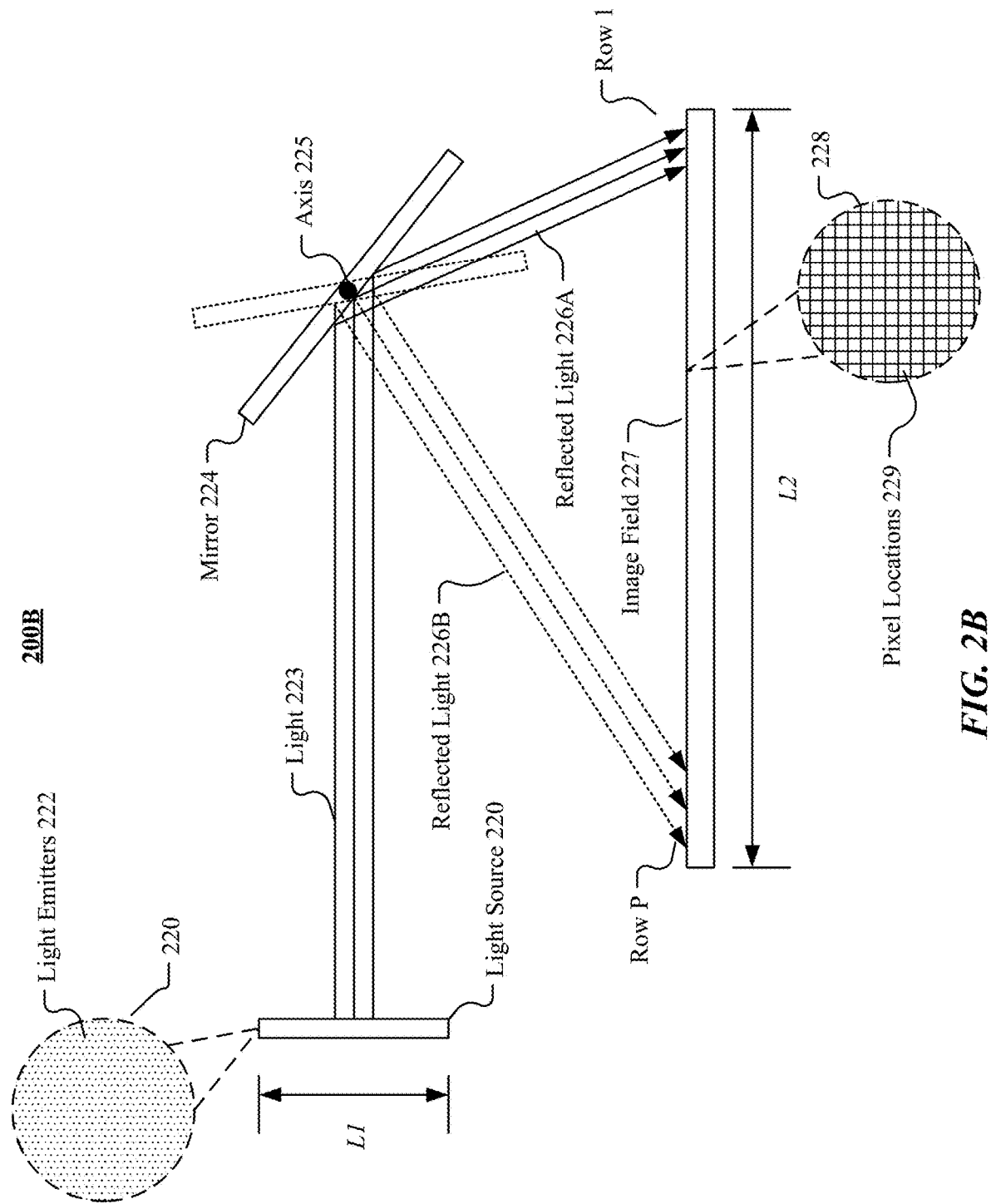
FIG. 2B illustrates an example scanning operation of the scanning waveguide display.

FIG. 2B illustrates an example scanning operation of a scanning waveguide display 200B. The light source 220 may include an array of light emitters 222 (as represented by the dots in inset) with multiple rows and columns. The light 223 emitted by the light source 220 may include a set of collimated beams of light emitted by each column of light emitters 222. Before reaching the mirror 224, the light 223 may be conditioned by different optical devices such as the conditioning assembly (not shown). The mirror 224 may reflect and project the light 223 from the light source 220 to the image field 227 by rotating about an axis 225 during scanning operations. The mirror 224 may be a microelectromechanical system (MEMS) mirror or any other suitable mirror. As the mirror 224 rotates about the axis 225, the light 223 may be projected to a different part of the image field 227, as illustrated by the reflected part of the light 226A in solid lines and the reflected part of the light 226B in dash lines.

In particular embodiments, the image field 227 may receive the light 226A-B as the mirror 224 rotates about the axis 225 to project the light 226A-B in different directions. For example, the image field 227 may correspond to a portion of the coupling element 218 or a portion of the decoupling element 206 in FIG. 2A. In particular embodiments, the image field 227 may include a surface of the coupling element 206. The image formed on the image field 227 may be magnified as light travels through the output waveguide 220. In particular embodiments, the image field 227 may not include an actual physical structure but include an area to which the image light is projected to form the images. The image field 227 may also be referred to as a scan field. When the light 223 is projected to an area of the image field 227, the area of the image field 227 may be illuminated by the light 223. The image field 227 may include a matrix of pixel locations 229 (represented by the blocks in inset 228) with multiple rows and columns. The pixel location 229 may be spatially defined in the area of the image field 227 with a pixel location corresponding to a single pixel. In particular embodiments, the pixel locations 229 (or the pixels) in the image field 227 may not include individual physical pixel elements. Instead, the pixel locations 229 may be spatial areas that are defined within the image field 227 and divide the image field 227 into pixels. The sizes and locations of the pixel locations 229 may depend on the projection of the light 223 from the light source 220. For example, at a given rotation angle of the mirror 224, light beams emitted from the light source 220 may fall on an area of the image field 227. As such, the sizes and locations of pixel locations 229 of the image field 227 may be defined based on the location of each projected light beam. In particular embodiments, a pixel location 229 may be subdivided spatially into subpixels (not shown). For example, a pixel location 229 may include a red subpixel, a green subpixel, and a blue subpixel. The red, green and blue subpixels may correspond to respective locations at which one or more red, green and blue light beams are projected. In this case, the color of a pixel may be based on the temporal and/or spatial average of the pixel's subpixels.

In particular embodiments, the light emitters 222 may illuminate a portion of the image field 227 (e.g., a particular subset of multiple pixel locations 229 on the image field 227) with a particular rotation angle of the mirror 224. In particular embodiment, the light emitters 222 may be arranged and spaced such that a light beam from each of the light emitters 222 is projected on a corresponding pixel location 229. In particular embodiments, the light emitters 222 may include a number of light-emitting elements (e.g., micro-LEDs) to allow the light beams from a subset of the light emitters 222 to be projected to a same pixel location 229. In other words, a subset of multiple light emitters 222 may collectively illuminate a single pixel location 229 at a time. As an example and not by way of limitation, a group of light emitter including eight light-emitting elements may be arranged in a line to illuminate a single pixel location 229 with the mirror 224 at a given orientation angle.

In particular embodiments, the number of rows and columns of light emitters 222 of the light source 220 may or may not be the same as the number of rows and columns of the pixel locations 229 in the image field 227. In particular embodiments, the number of light emitters 222 in a row may be equal to the number of pixel locations 229 in a row of the image field 227 while the light emitters 222 may have fewer columns than the number of pixel locations 229 of the image field 227. In particular embodiments, the light source 220 may have the same number of columns of light emitters 222 as the number of columns of pixel locations 229 in the image field 227 but fewer rows. As an example and not by way of limitation, the light source 220 may have about 1280 columns of light emitters 222 which may be the same as the number of columns of pixel locations 229 of the image field 227, but only a handful rows of light emitters 222. The light source 220 may have a first length L1 measured from the first row to the last row of light emitters 222. The image field 530 may have a second length L2, measured from the first row (e.g., Row 1) to the last row (e.g., Row P) of the image field 227. The L2 may be greater than L1 (e.g., L2 is 50 to 10,000 times greater than L1).

In particular embodiments, the number of rows of pixel locations 229 may be larger than the number of rows of light emitters 222. The display device 200B may use the mirror 224 to project the light 223 to different rows of pixels at different time. As the mirror 520 rotates and the light 223 scans through the image field 227, an image may be formed on the image field 227. In some embodiments, the light source 220 may also has a smaller number of columns than the image field 227. The mirror 224 may rotate in two dimensions to fill the image field 227 with light, for example, using a raster-type scanning process to scan down the rows then moving to new columns in the image field 227. A complete cycle of rotation of the mirror 224 may be referred to as a scanning period which may be a predetermined cycle time during which the entire image field 227 is completely scanned. The scanning of the image field 227 may be determined and controlled by the mirror 224 with the light generation of the display device 200B being synchronized with the rotation of the mirror 224. As an example and not by way of limitation, the mirror 224 may start at an initial position projecting light to Row 1 of the image field 227, and rotate to the last position that projects light to Row P of the image field 227, and then rotate back to the initial position during one scanning period. An image (e.g., a frame) may be formed on the image field 227 per scanning period. The frame rate of the display device 200B may correspond to the number of scanning periods in a second. As the mirror 224 rotates, the light may scan through the image field to form images. The actual color value and light intensity or brightness of a given pixel location 229 may be a temporal sum of the color various light beams illuminating the pixel location during the scanning period. After completing a scanning period, the mirror 224 may revert back to the initial position to project light to the first few rows of the image field 227 with a new set of driving signals being fed to the light emitters 222. The same process may be repeated as the mirror 224 rotates in cycles to allow different frames of images to be formed in the scanning field 227.

Figure 3B:
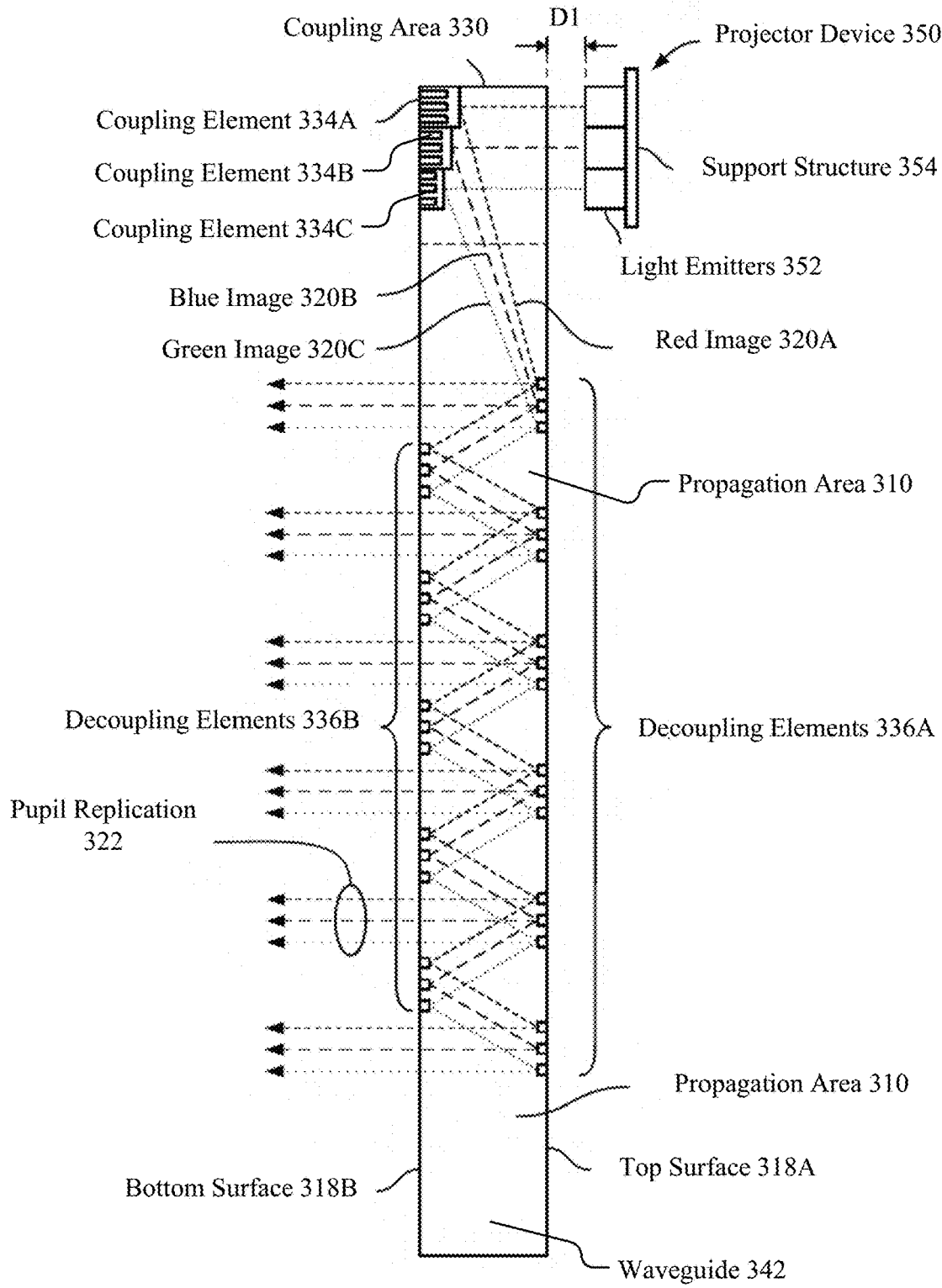
FIG. 3B illustrates an example waveguide configuration for the 2D micro-LED waveguide display.

FIG. 3A illustrates an example 2D micro-LED waveguide display 300A. In particular embodiments, the display 300A may include an elongate waveguide configuration 302 that may be wide or long enough to project images to both eyes of a user. The waveguide configuration 302 may include a decoupling area 304 covering both eyes of the user. In order to provide images to both eyes of the user through the waveguide configuration 302, multiple coupling areas 306A-B may be provided in a top surface of the waveguide configuration 302. The coupling areas 306A and 306B may include multiple coupling elements to receive image light from light emitter array sets 308A and 308B, respectively. Each of the emitter array sets 308A-B may include a number of monochromatic emitter arrays including, for example, but not limited to, a red emitter array, a green emitter array, and a blue emitter array. In particular embodiments, the emitter array sets 308A-B may further include a white emitter array or an emitter array emitting other colors or any combination of any multiple colors. In particular embodiments, the waveguide configuration 302 may have the emitter array sets 308A and 308B covering approximately identical portions of the decoupling area 304 as divided by the divider line 309A. In particular embodiments, the emitter array sets 308A and 308B may provide images to the waveguide of the waveguide configuration 302 asymmetrically as divided by the divider line 309B. For example, the emitter array set 308A may provide image to more than half of the decoupling area 304. In particular embodiments, the emitter array sets 308A and 308B may be arranged at opposite sides (e.g., 180° apart) of the waveguide configuration 302 as shown in FIG. 3B. In other embodiments, the emitter array sets 308A and 308B may be arranged at any suitable angles. The waveguide configuration 302 may be planar or may have a curved cross-sectional shape to better fit to the face/head of a user.

FIG. 3B illustrates an example waveguide configuration 300B for the 2D micro-LED waveguide display. In particular embodiments, the waveguide configuration 300B may include a projector device 350 coupled to a waveguide 342. The projector device 320 may include a number of light emitters 352 (e.g., monochromatic emitters) secured to a support structure 354 (e.g., a printed circuit board or other suitable support structure). The waveguide 342 may be separated from the projector device 350 by an air gap having a distance of D1 (e.g., approximately 50 μm to approximately 500 μm). The monochromatic images projected by the projector device 350 may pass through the air gap toward the waveguide 342. The waveguide 342 may be formed from a glass or plastic material. The waveguide 342 may include a coupling area 330 including a number of coupling elements 334A-C for receiving the emitted light from the projector device 350. The waveguide 342 may include a decoupling area with a number of decoupling elements 336A on the top surface 318A and a number of decoupling elements 336B on the bottom surface 318B. The area within the waveguide 342 in between the decoupling elements 336A and 336B may be referred as a propagation area 310, in which image light received from the projector device 350 and coupled into the waveguide 342 by the coupling element 334 may propagate laterally within the waveguide 342.

The coupling area 330 may include coupling elements (e.g., 334A, 334B, 334C) configured and dimensioned to couple light of predetermined wavelengths (e.g., red, green, blue). When a white light emitter array is included in the projector device 350, the portion of the white light that falls in the predetermined wavelengths may be coupled by each of the coupling elements 334A-C. In particular embodiments, the coupling elements 334A-B may be gratings (e.g., Bragg gratings) dimensioned to couple a predetermined wavelength of light. In particular embodiments, the gratings of each coupling element may exhibit a separation distance between gratings associated with the predetermined wavelength of light and each coupling element may have different grating separation distances. Accordingly, each coupling element (e.g., 334A-C) may couple a limited portion of the white light from the white light emitter array of the projector device 350 if white light emitter array is included in the projector device 350. In particular embodiments, each coupling element (e.g., 334A-C) may have the same grating separation distance. In particular embodiments, the coupling elements 334A-C may be or include a multiplexed coupler.

As illustrated in FIG. 3B, a red image 320A, a blue image 320B, and a green image 320C may be coupled by the coupling elements 334A, 334B, 334C, respectively, into the propagation area 310 and may begin to traverse laterally within the waveguide 342. A portion of the light may be projected out of the waveguide 342 after the light contacts the decoupling element 336A for one-dimensional pupil replication, and after the light contacts both the decoupling elements 336A and 336B for two-dimensional pupil replication. In two-dimensional pupil replication, the light may be projected out of the waveguide 342 at locations where the pattern of the decoupling element 336A intersects the pattern of the decoupling element 336B. The portion of the light that is not projected out of the waveguide 342 by the decoupling element 336A may be reflected off the decoupling element 336B. The decoupling element 336B may reflect all incident light back toward the decoupling element 336A. Accordingly, the waveguide 342 may combine the red image 320A, the blue image 320B, and the green image 320C into a polychromatic image instance which may be referred as a pupil replication 322. The polychromatic pupil replication 322 may be projected to the user's eyes which may interpret the pupil replication 322 as a full color image (e.g., an image including colors addition to red, green, and blue). The waveguide 342 may produce tens or hundreds of pupil replication 322 or may produce a single replication 322.

In particular embodiments, the AR/VR system may use scanning waveguide displays or 2D micro-LED displays for displaying AR/VR content to users. In order to miniaturize the AR/VR system, the display system may need to miniaturize the space for pixel circuits and may have limited number of available bits for the display. The number of available bits in a display may limit the display's color depth or gray scale level, and consequently limit the quality of the displayed images. Furthermore, the waveguide displays used for AR/VR systems may have nonuniformity problem cross all display pixels. The compensation operations for pixel nonuniformity may result in loss on image grayscale and further reduce the quality of the displayed images. For example, a waveguide display with 8-bit pixels (i.e., 256 gray level) may equivalently have 6-bit pixels (i.e., 64 gray level) after compensation of the nonuniformity (e.g., 8:1 waveguide nonuniformity, 0.1% dead micro-LED pixel, and 20% micro-LED intensity nonuniformity).

The display of AR/VR display systems may have different sizes, shapes, or/and layouts (e.g., arrangement patterns) for subpixels of different color channels of RGB. For example, the subpixels of different color channels may have an arbitrary size, shape, or/and layout depending on the manufacturer of the display. As a result, directly mapping image pixel values to the display subpixels may generate artifacts (e.g., color aliasing, color fringing) in the displayed image, and negatively affect the user experience.

In particular embodiments, the AR/VR system may use a constrained rendering framework to mitigate the chromatic aliasing artifacts induced by arbitrary 2D pixel layout (e.g., subpixel geometry, size, and layout) in a single-panel display or multiple-panel display. The constrained rendering framework may be a generalized rendering framework that is applicable to both 1D pixel array and 2D pixel array having arbitrary 2D subpixel geometries and layouts. The constrained rendering framework may use an optimization filter to determine optimized pixel values based on the original pixels of the images and may use a constraint matrix to determine the target color values based on the optimized pixel values. The optimization filter may be optimized to allow the displayed images to have minimum mean-squared error (MSE) in the opponent color space as perceived by the user. During the optimization process, the constraint matrix for a particular color channel may be generated based on the subpixel sizes, subpixel shapes, and subpixel layout patterns of that color channel. The constraint matrix may be used to determine the target color values based on the optimized values. After that, the system may compare the target color values and the original pixel values of the image to determine the mean-squared error (MSE) of the target color values and feed that information back to the optimization process to minimize the mean-squared error (MSE) in the opponent color space. At runtime, the system may determine target color values based on the original pixel values using the optimized optimization filter and the constraint matrix (e.g., incorporated into a single filter) and output the target color values to the display. As a result, the displayed image may eliminate or reduce the artifacts caused by the difference between the display subpixels (e.g., size, shape, layout) of different color channels, and have better image quality.

By using the constrained rendering framework, particular embodiments of the system may suppress color fringing artifacts in a single-panel or multiple-panel color matrix display that has different subpixel layouts for different color channels. By using the constrained rendering framework, particular embodiments of the system may have flexibility of using single-panel or multiple-panel color matrix display to achieve improved image quality (e.g. RGB diagonal pattern), improved power efficiency (e.g. RGBW pattern), and improved pixel lifetime (e.g. Pentile pattern). In particular embodiments, the constrained rendering framework may allow AR/VR system to use multiple-panel display with different subpixel sizes and/or subpixel layouts in RGB color channels to have improved manufacturability. In addition, the constrained rendering framework may allow the AR/VR system to use a larger pixel in particular color channel to reduce data bandwidth at the chromatic channels to which the human vision is less sensitive.

In particular embodiments, for both single-panel color matrix display and multi-panel color matrix display, the term "subpixel" may refer to the physical subpixel of a particular color channel. For example, a red subpixel may refer to a physical subpixel of the red color channel, a blue subpixel may refer to a physical subpixel of the blue color channel, and a green subpixel may refer to a physical subpixel of the green color channel. The term "physical subpixel" of a color channel may correspond to a basic light-emitting unit (e.g., LED, micro-LED, etc.) for emitting light of that particular color. In particular embodiments, for single-panel display, the term "pixel" or "display pixel" may refer to a physical pixel of the display that includes RGB subpixels. The number of subpixels of a particular color that are included in a "pixel" of a single-panel display may be different from the number of subpixels of other colors. For example, a display pixel may include one red subpixel, one green subpixel, and one blue pixel. As another example, a display pixel may include two red subpixels, two blue subpixels and one green pixels. The subpixels of different color channels may have different sizes or/and shapes. A display pixel of a single-panel display may correspond to an image pixel including RGB color components. In particular embodiments, the term "image pixel" may refer to an image pixel accessed from an image including at least three values corresponding the RGB color components. For example, an image pixel may include a red color component, a blue color component, and a green color component.

In particular embodiments, for both single-panel display and multi-panel display, the term "micro-pixel" may refer to a conceptual pixel having a size by which the sizes of the subpixels of RGB color channels can be exactly divided without remainder. In other words, the micro-pixel may correspond to a basic unit size that allows that the subpixels of RGB color channels to be divided into integer times of the basic unit size. It is notable that micro-pixel may correspond to a conceptual basic unit size which can be used to define the size of subpixel of RGB color channels and may not necessarily correspond to actual or physical subpixels. In particular embodiment, for multi-panel displays, the term "macro-pixel" may refer to a group of subpixels that serve as one pixel and correspond to one image pixel including RGB color components. In particular embodiments, a "macro-pixel" may correspond to the smallest subpixel group that includes subpixels of all three color channel of RGB with the condition that all RGB pixels are included entirely (e.g., all included pixels are included as whole pixels rather than partially). A macro-pixel for multi-panel display may include a number of subpixels of each color channel of RGB. The size the macro-pixel may be measured with respect to the basic unit size corresponding to the micro-pixel. In particular embodiments, the term "image pixel value" may refer to numerical values of pixels of an image to be displayed. An image pixel value may include three color component values of RGB color channels. In particular embodiments, for single-panel displays, the term "pixel value" may refer to a value that corresponds to a pixel of the single-panel display. The pixel value may include RGB color components for RGB subpixels within the pixel of the single-panel display. In particular embodiments, the term "color value" may refer to a value of a color component that need to be assigned to and displayed by a subpixel of a particular color channel of RGB color channels. In particular embodiments, the term "optimized pixel value" may refer to image pixel values that are adjusted by an optimization filter to minimize the mean-squared error in the opponent color domain.

Figure 4A:
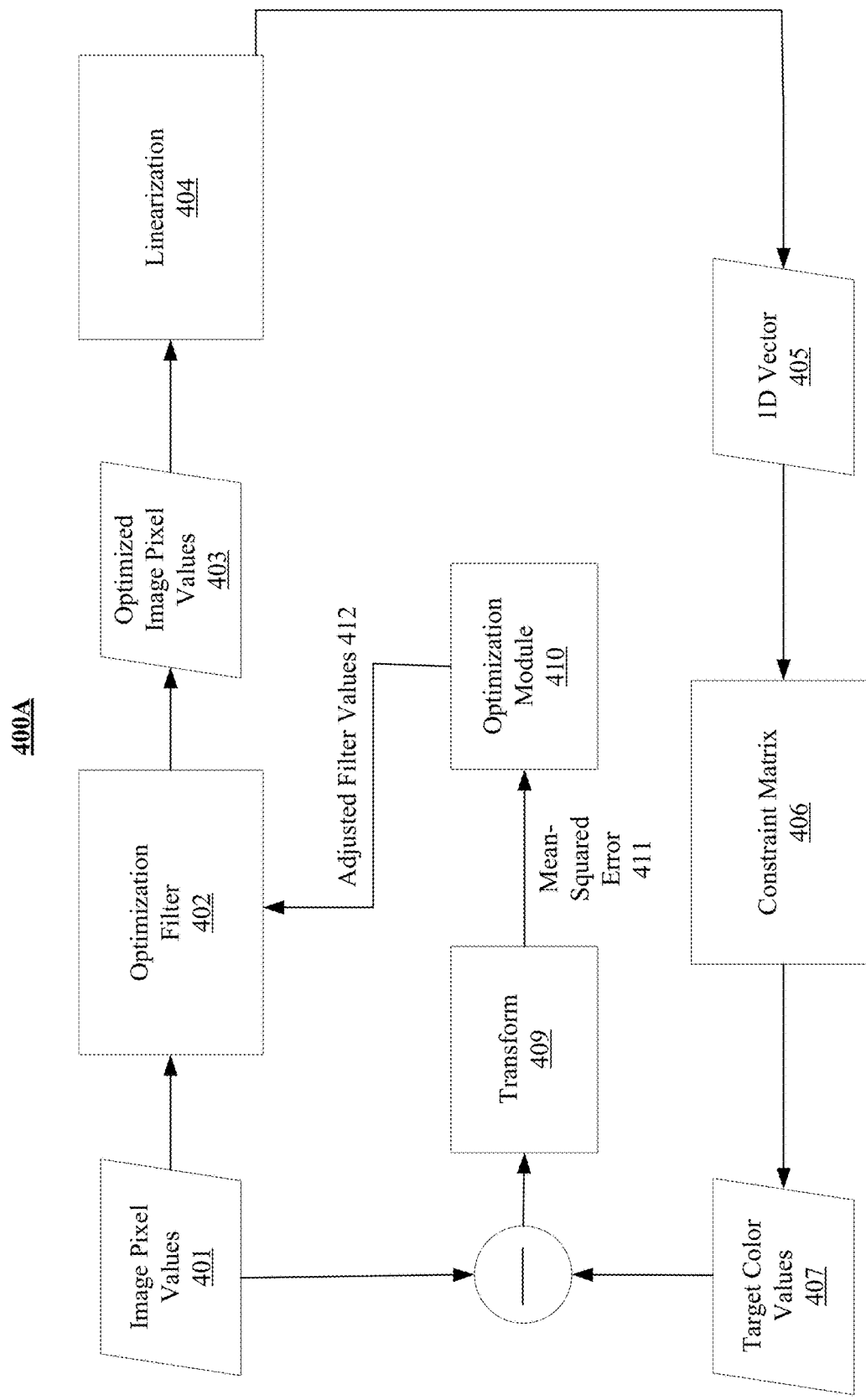
FIG. 4A illustrates an example process for optimizing an optimization filter for the constrained rendering framework.

FIG. 4A illustrates an example process 400A for optimizing an optimization filter for the constrained rendering framework. In particular embodiments, the constrained rendering framework may include an optimization filter 402, an optional linearization module 404, a constraint matrix 406, a transform module 409, an optimization module 410, etc. The optimization filter 402 may be a 2D matrix that can be used to calculate the optimized pixel values 403 based on the original image pixel values 401. Each optimized pixel value may be associated with a particular color channel and may depend on corresponding original pixel values of all three color channels. The filter values in the optimization filter 402 may be optimized during a filter optimization process. The optimization filter 402 with the optimized filter values may allow the displayed images to have minimum mean-squared error (MSE) in the opponent color space as perceived by the user. The system may determine original image pixel values 401 by accessing the pixel values of an image to be displayed. Then, the system may apply the optimization filter 402 with current filter values to the original image pixel values 401 and determine optimized pixel values 403. After that, the system may feed the optimized image pixel values 403 to the linearization module 404 to generate a 1D vector 405. The 1D vector 405 may include all the optimized image pixel values 403 that are re-organized into a 1D vector. Then, the system may apply the constraint matrix 406 to the 1D vector to determine the target color values 407. The system may use the constraint matrix 406 to determine the target color values (e.g., by mapping and averaging the optimized pixel values to the display subpixels according to the layout of the subpixels). In particular embodiments, for multi-panel color matrix displays, the constraint matrix 406 may be for a particular color channel and may be generated based on the sizes, shapes, or/and layouts of subpixels of that particular color channel. The subpixels of different color channels may have different sizes and layouts. Then, the system may compare the target color values 407 to the original image pixel value 401 and convert the comparison results into the opponent color space using the transform module 409. The transform module 409 may use a Fourier transform function, an opponent space transform function, and a 2D contrast sensitivity function (CSF) to convert the comparison results from the RGB color space into the opponent color space. Then, the system may determine mean-squared error (MSE) 411 and feed that to the optimization module 410 which may determine the adjusted filter values based on the current filter values and the mean-squared error (MSE) 411. The adjusted values may allow the system to minimize the mean-squared error (MES) for the displayed image as perceived by the user. Then, the system may send the adjusted filter values to the optimization filter 402 to update the filter values. It is notable that, in particular embodiments, the linearization module and the linearization step may be optional. The linearization module and the linearization step may be needed when the system expresses the problem in matrix-vector form. The linearization module may not be needed when the system expresses the problem in 2D matrix directly. The convolution filters may always be 2D matrixes because the images that are processed and displayed are 2D.

Figure 4B:
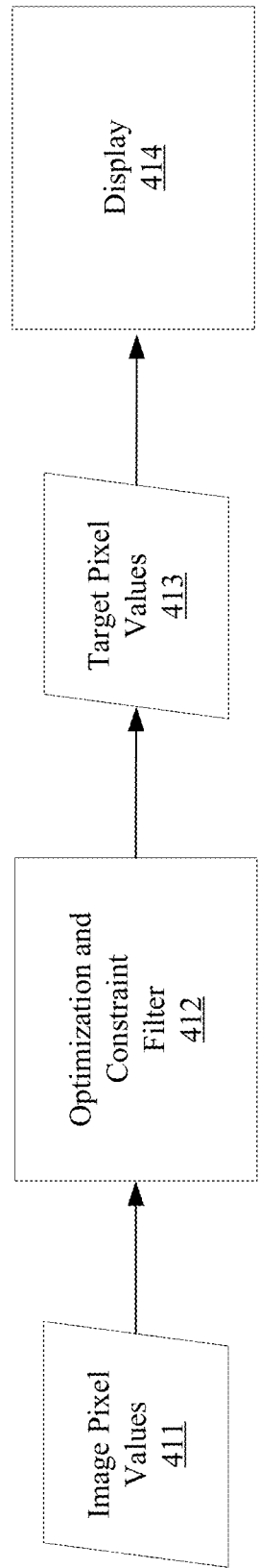
FIG. 4B illustrates an example process for applying an optimization and constraint filter at run time.

FIG. 4B illustrates an example process 400B for applying an optimization and constraint filter at run time. In particular embodiments, after the system has determined the optimization filter values and the constraint matrix, the system may generate an overall optimization and constraint filter or matrix which incorporates both the optimization filter and the constraint matrix (and other intermediate matrixes if applicable). At run time, the system may access image pixel values from an image to be displayed and then apply the optimization and constraint filter 412 to the image pixel values to determine the target color values 413. Then, the system may output the target color values 413 to the subpixels of the display 414. As a result, the displayed image as represented by the target color values may have the minimum mean-squared error (MSE) in the opponent color space as perceived by the user.

In particular embodiments, the system may use a filter optimization process to optimize the filter values and determine the best filters that can minimize the mean-squared error of the displayed image in the opponent color space. In particular embodiments, the filter optimization process may be based on the opponent vision model of human perception taking into consideration of chromatic aliasing artifact suppression. The fact that human vision response (HVS) to luminance and chrominance has different spatial frequency sensitivities may allow the display system to hide the chromatic aliasing artifacts at the frequencies where the HVS has the least sensitivity. In particular embodiments, a set of perceptually "optimal" filters may be analytically derived by solving an optimization problem in which the mean-squared perceived error (E) in the Fourier opponent color space is used as the objective function.

To optimize the filer values, the system may first use the filter with the initial filter values or current filter values to determine optimized pixel values $\tilde{x}$ based on the original image pixel values x. Then, the system may determine the target color values based on the optimized pixel values according to the constraint matrix which corresponds to display's subpixel sizes, shapes, and layouts. The target color values may correspond to the optimized pixel values as constrained by the constraint matrix $S\tilde{x}$. The system may compare the target color values $S\tilde{x}$ to the original image pixel values x and determine their difference represented by a difference matrix ($S\tilde{x}-x$). After that, the system may transform the difference matrix ($S\tilde{x}-x$) from the RGB color space to the opponent color space using the Fourier transform F, the opponent color space transform C, and a 2D contrast sensitivity function (CSF) in the opponent color space W. In other words, the system may use perceptual metrics to measure the difference between the target RGB color values $S\tilde{x}$ (which are to be output to display) and the high-resolution image pixel values x as transformed from the RGB space to the opponent color space and weighted by a 2D contrast sensitivity function (CSF) in the opponent space (W). In particular embodiments, the filter optimization process may be represented by the following equation:

$$\varepsilon(\tilde{x}) = \|WC\,\mathcal{F}\,\{S\tilde{x}-x\}\|^2 \quad (1)$$

where $\varepsilon(\tilde{x})$ is the sum of the $\ell$ 2-norm for an associated color channel. The system may optimize the filter by finding the filter values that minimize the $\varepsilon(\tilde{x})$. The target RGB color values of the display $S\tilde{x}$ and the corresponding optimized filter values may be determined by minimizing the sum of the $\ell$ 2-norm of each color channel. As a result, the filter with the optimized filter values may allow the displayed images to have the minimum mean-squared perceived error ($\varepsilon$) in the opponent color space as perceived by the user. In particular embodiments, the subpixel geometry may be accounted for by applying a constraint matrix (S), where equality constraints are enforced on specific indices. In particular embodiments, the transform matrix for transforming RGB color space to the opponent color space may be represented by the following equation:

$$C = \begin{bmatrix} 0.5774 & 0.5774 & 0.5774 \\ -0.5774 & 0.7887 & -0.2113 \\ -0.5774 & -0.2113 & 0.7887 \end{bmatrix} \quad (2)$$

On the other hand, the 2D CSF filters in the opponent space may formulated with the following parameters:

$$CSF_L(f) = 75f^{0.8}e^{-0.2f} \quad (3)$$

$$CSF_{O_1}(f) = 109.1413e^{-0.00038f^{3.42436}} + 93.59711e^{-0.00367f^{2.16771}}$$

$$CSF_{O_2}(f) = 7.032845e^{-0.000004f^{4.258205}} + 40.69095e^{-0.103909f^{1.648658}}$$

where L denotes the luminance channel; $O_1$ and $O_2$ denote the two chrominance channels R-G and B-Y, respectively. In particular embodiments, the system may assume that the display screen is viewed at 15 cycle per degree (cpd), which may correspond to a viewing distance of 17 inch for a 100 pixel per inch (ppi) display.

In particular embodiments, based on the quadratic representation of the objective function as shown in Equation (1), the system may solve the optimization problem by solving $\nabla \varepsilon(\tilde{x})=0$ which reduces to a linear system ($\tilde{x}=Hx$). As a result, the optimal filter (H) may be obtained as $[\mathrm{Re}\{W_{i,j}\}]^{-1}\mathrm{Re}\{W_i\}$, where, W denotes the CSF in the Fourier domain in a quadratic form (i.e. $W=F^{*T}C^TW^TWCF$); F denotes the discrete Fourier transform matrix; i and j indicate the row and column numbers associated with the subpixel structure, respectively. In particular embodiments, the only variable in the solution that may vary from case to case may be the subpixel structure, which may be implicitly encoded by the i,j indices.

In particular embodiments, the matrix solution of optimal filtering may need a large amount of computation $O(N^2 \times N^2)$. To solve this problem, particular embodiments of the system may use the matrix that is block circulant by nature and therefore can be replaced with a set of cross-channel convolution kernels, which greatly reduces the computational complexity. As a result, the optimized pixel values for the display may be acquired using the following equation:

$$\begin{bmatrix} \tilde{x}^r \\ \tilde{x}^g \\ \tilde{x}^b \end{bmatrix} = \begin{bmatrix} H_{rr} & H_{rg} & H_{rb} \\ H_{gr} & H_{gg} & H_{gb} \\ H_{br} & H_{bg} & H_{bb} \end{bmatrix} * \begin{bmatrix} x^r \\ x^g \\ x^b \end{bmatrix} \quad (4)$$

where $*$ is the convolution operator; $\tilde{x}^{c \in \{r,g,b\}}$ and $x^{c \in \{r,g,b\}}$ denote the vectorized optimized pixel values and original image pixel values in each color channel, respectively. Applying optimal filtering with convolution filters may reduce the computation complexity to $O(N \times N \times D^c)$ in a multiple-panel display, where the $D^c$ factor may account for the subpixel resolution/geometry differences between R, G, and B display panels (as shown in Equation 6, as discussed in later sections of this disclosure).

Figure 5A:
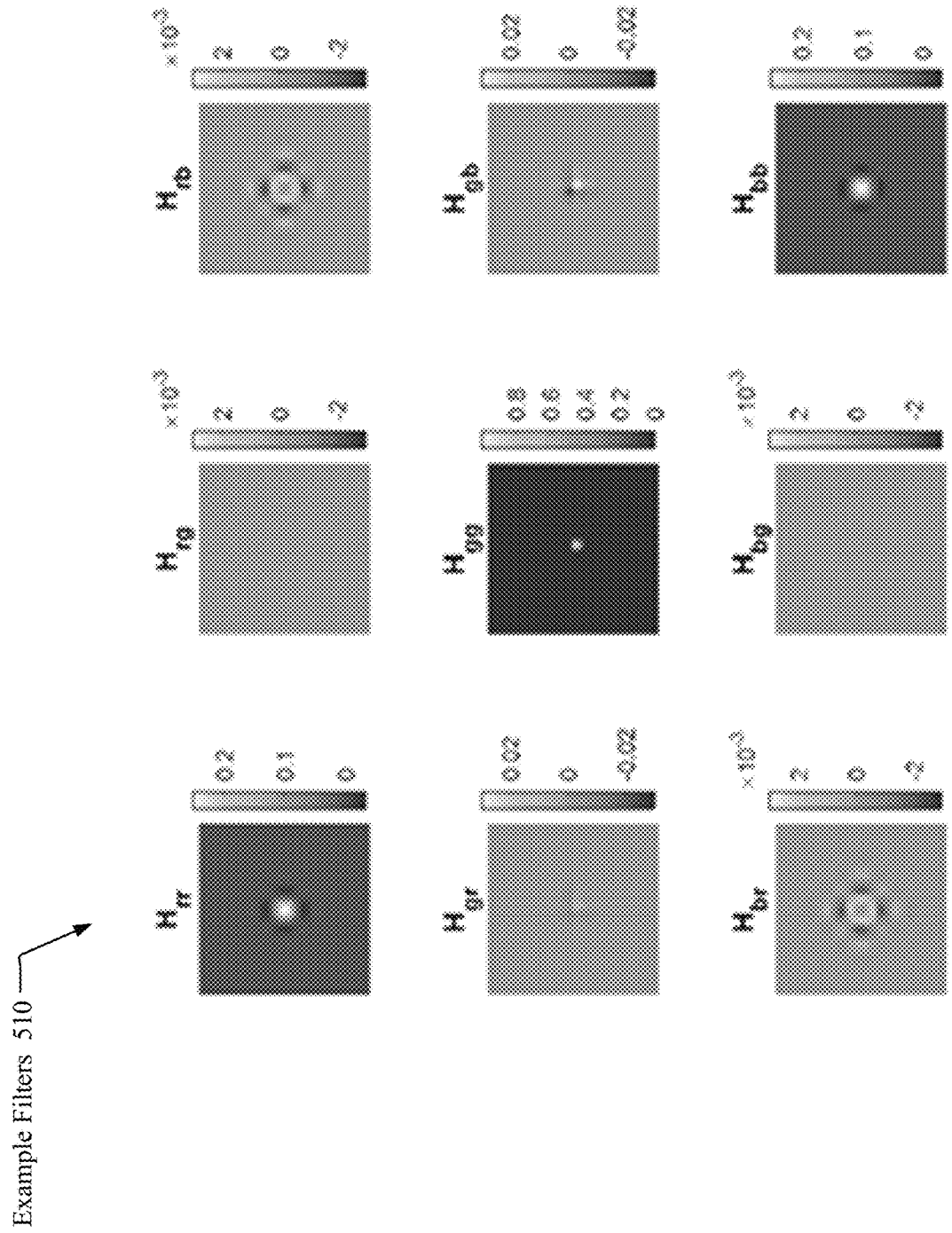
FIGS. 5A-5B illustrate example patterns for the optimization filter that can be used for determining the optimized pixel values.
Figure 5B:
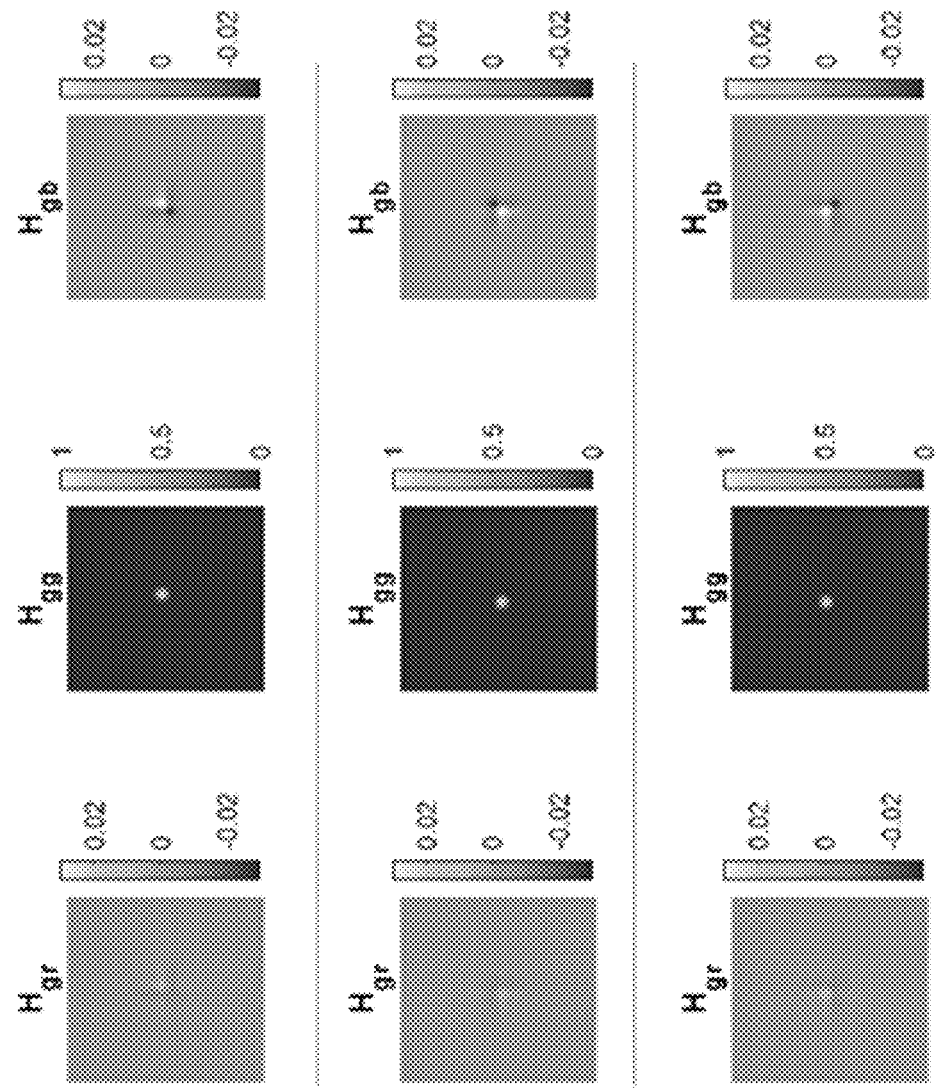

FIGS. 5A-5B illustrate example patterns 510 for the optimization filter that can be used for determining the optimized pixel values. The figures in FIG. 5A may present a set of convolution filter kernels (optimal filters) for a multiple-panel display with square R, G, B subpixels with different subpixel sizes (R, G, B subpixels have a size of 2×2, 1×1, 2×2, respectively, as shown FIGS. 6A-6C). The filter coefficients may be acquired in the RGB pixel space, and hence the full width half maximum (FWHM) of the central peaks may be positively correlated with the subpixel sizes, geometries, or/and layouts. Due to the halved resolutions in R and B subpixels, the same-color filters $H_{rr}$ and $H_{bb}$ may both exhibit a FWHM twice as larger as that of $H_{gg}$. In addition, this R/G/B geometry combination may indicate that for every R or B subpixel value there exists $D^g=4$ independent G subpixel values. Therefore, for the cross-channel filters with regard to R and B channels ($H_{rc}$ and $H_{bc}$, for $c \in \{r,g,b\}$), each may have a filter kernel of size N×N, $H_{gc}$ contains 4 separate kernels instead (FIG. 5A and FIG. 5B). In particular embodiments, the multi-panel display system may be different from a single-panel display system. The macro-pixel for the multi-plane display may include a number of subpixels for each color channel having one or more unique subpixel values for each color channel of RGB, while the macro-pixel for single-panel display may corresponding to the pixel of the single-panel display and may include only one unique subpixel value in each R, G, and B subpixel.

It can be seen from FIG. 5A that the cross-channel filters may have much lower amplitudes as compared to that in the same-channel filters. In addition, the filter amplitude may peak near the central region and may drop quickly at the adjacent region. This may suggest that the size of the convolution filters may not need to be large, and hence may provide additional opportunities to further reduce the computational complexity. In this example, the system may first extract a set optimal convolution filters with a size of N×N for each R, G, B geometry combination. Subsequently, the filters may be zero padded to the image size before being applied to the images. Note that the filter kernels may only need to be computed once for each set of R, G, and B geometry combination. In this example, the constrained rendering may be implemented in the linear domain. Apart from the de-gamma linearization, the system may use no other display processing techniques. To simulate the perceptual processing of the HVS, the system may apply additional low-pass filtering on the convolution filtered output. In this example, the optics of the system, such as the modulation transfer function (MTF) of the waveguide in AR/VR display displays, may not have been considered in the display pipeline.

FIGS. 6A-6E illustrate an example process to determine the constraint matrixes for particular subpixel layouts. When the subpixels of the RGB color channels have the same sizes, geometries, and layout patterns, and when the subpixels of each color channel are aligned with respect to subpixels of other color channels, the subpixels of different color channels may have a one-to-one correspondence relationship. In this scenario, the image pixel values with RGB color components may be directly mapped to the display subpixels of corresponding color channels. However, when the display subpixels of different color channels have different sizes, geometries, or/and subpixel layout patterns, the constrained rendering framework may be used to eliminate or reduce the artifacts and improve the quality of the displayed image.

As an example and not by way of limitation, the subpixels of the red color channel, as shown in FIG. 6A, and the subpixel of the blue color channel, as shown in FIG. 6C, may have larger sizes than the subpixels of the green color channel, as shown in FIG. 6B. In this particular example, the size of the red subpixel may be 2×3 times of the size of the green subpixel and the size of the blue subpixel may be 3×2 times of the size of the green subpixel. Because the red subpixel size and the blue subpixel size can be divided exactly by the green subpixel size without remainder, the green subpixel size may be used as a basic unit size corresponding to the micro-pixel. As a result, the red subpixel size, the green subpixel size, and the blue subpixel size may be defined as 2×3, 1×1, and 3×2, respectively, with respect to the micro-pixel size corresponding to the basic unit size. It is notable that, in particular embodiments, the subpixel size of each color channel may have arbitrary size and arbitrary relative relationship. For example, the subpixel size of a color channel may not be necessarily dividable by the subpixel size of other color channel. In that scenario, the system may define a micro-pixel corresponding to a basic unit size based on a mathematic unit size by which the subpixel sizes of all three color channels can be exactly divided without remainder.

In particular embodiments, a multi-panel display may have different RGB subpixel sizes and the system may define the subpixel resolution of RGB color channels as measured by micro-pixel size corresponding to the basic unit size by which the subpixel sizes of RGB color channels are divided exactly without remainder. For example, a subpixel resolution of a particular color channel as measured by the micro-pixel size may be determined by the following equation:

$$a^c = h^c \times w^c \quad (5)$$

where, a is the subpixel resolution of the color channel $c \in \{r,g,b\}$; h is the height as measured by the micro-pixel corresponding to the basic unit size; w is the width as measured by the micro-pixel corresponding to the basic unit size. In particular embodiments, the macro-pixel may be the smallest unit that includes subpixels of all three color channel of RGB with the condition that all RGB subpixels are included entirely (e.g., all included pixels are included as whole pixels rather than partially). In particular embodiments, each macro pixel may contain a total number of micro-pixels as determined using the following equation:

$$D^{c \in \{r,g,b\}} = \text{LCM}(h^r, h^g, h^b) \times \text{LCM}(w^r, w^g, w^b)/a^c \quad (6)$$

where, LCM is least common multiple. As an example and not by way of limitation, the red subpixel (e.g., 611) in FIG. 6A may include 2×3 micro-pixels (i.e., 2×3 basic unit sizes), the green subpixel (e.g., 611B) in FIG. 6B may include 1×1 micro-pixel (i.e., 1×1 basic unit size), and the blue subpixel 611C in FIG. 6C may include 3×2 micro-pixels (i.e., include 3×2 basic unit size).

As an example and not by way of limitation, a display system may have rectangular subpixels on each color channel (e.g., each display panel). The subpixel patterns of R, G, B may be 2×3, 1×1, 3×2, respectively, as shown in FIGS. 6A-6C. For the red subpixels, the subpixel constraints may be described by the following equation:

$$\tilde{x}_{i,j}^r = \tilde{x}_{i,j+1}^r = \tilde{x}_{i,j+2}^r = \tilde{x}_{i+1,j}^r = \tilde{x}_{i+1,j+1}^r = \tilde{x}_{i+1,j+2}^r \quad (7)$$

where, $\tilde{x}_{i,j}^c$ denotes the display micro-pixel values at row i and column j for color channel c, i=n*2, j=m*3, where n and m are integer starting from zero. In other words, for each red micro-pixel located at (i,j), where i=n*2, j=m*3, n and m are integer starting from zero, the red micro-pixels corresponding to the locations of (i,j+1), (i,j+2), (i+1,j), (i+1,j+1), (i+1,j+2) may have the same color value with respect to the micro-pixel color value of (i,j). Similarly, for the blue micro-pixels, the subpixel constraints may be described by the following equation:

$$\tilde{x}_{i,j}^b = \tilde{x}_{i,j+1}^b = \tilde{x}_{i+1,j}^b = \tilde{x}_{i+1,j+1}^b = \tilde{x}_{i+2,j}^b = \tilde{x}_{i+2,j+1}^b \quad (8)$$

where, $\tilde{x}_{i,j}^c$ denotes the display pixel values at row i and column j for color channel $c \in (r,g,b)$, i=n*3, j=m*2, where n and m are integer starting from zero. In other words, for each blue micro-pixel located at (i,j), where i=n*3,j=m*2, and n and m are integer starting from zero, the blue micro-pixels corresponding to the locations of (i,j+1), (i+1, j), (i+1,j+1), (i+2,j+1) may have the same color value with respect to the micro-pixel value of (i,j). In this example, one macro-pixel may include of 6×6 micro-pixels, which allows 6 independent R and B color values and 36 independent G color values to be produced. As a result, the total degree of freedom may be reduced from 108 to 48.

In particular embodiments, the system may determine the color value for a particular subpixel based on an average of the color values of the micro-pixels contained in that particular subpixel. For example, the color value for the red subpixel 611A may be determined averaging the color values for the micro-pixels of (1, 1), (1, 2), (1, 3), (2, 1), (2, 2), and (2, 3). In other words, the color value for the subpixel 611A may be determined by summing up the color values for micro-pixels of (1, 1), (1, 2), (1, 3), (2, 1), (2, 2), and (2, 3) and dividing the sum by 6. As another example, the color value for each green subpixel (e.g., 611B) may equal to the color value of the corresponding micro-pixel. As another example, the color value for the blue subpixel 612C may be determined averaging the color values for the micro-pixels of (1, 1), (1, 2), (2, 1), (2, 1), (3, 1), and (3, 2). In other words, the color value for the subpixel 612C may be determined by summing up the color values for micro-pixels of (1, 1), (1, 2), (2, 1), (2, 1), (3, 1), and (3, 2) and dividing the sum by 6.

As an example and not by way of limitation, the display system with R, G, B color matrix panels may contain square subpixels of size 2×2, 1×1, 2×2, respectively, with respect to the unit size of the micro-pixel. The system may define a macro pixel of size 2×2 as measured by the micro-pixel size corresponding to the green subpixel size. In this scenario, the subpixel equality constraints imposed on the red ($\tilde{x}^r$) and blue ($\tilde{x}^b$) subpixels of the display may be represented by the following Equation (9) and (10), respectively:

$$\tilde{x}^r_{i,j} = \tilde{x}^r_{i,j+1} = \tilde{x}^r_{i+1,j} = \tilde{x}^r_{i+1,j+1} \quad (9)$$

$$\tilde{x}^b_{i,j} = \tilde{x}^b_{i,j+1} = \tilde{x}^b_{i+1,j} = \tilde{x}^b_{i+1,j+1} \quad (10)$$

where, $\tilde{x}_{i,j}^c$ denotes the display color values at row i and column j for color channel c∈(r,g,b), i=n*2,j=m*2, where n and m are integer starting from zero. Therefore, the relatively larger R and B subpixels may each emit based on one color value while G subpixels may exhibit four independent green values in the macro pixel. As a result, the total degree of freedom may be reduced from 12 to 6.

FIGS. 6D-6E illustrates an example process for mapping image pixel values to unconstrained micro-pixels. As an example and not by way of limitation, for the example subpixel layouts as shown in FIGS. 6A-6C, the system may define a micro-pixel based on the size of the green subpixel. Then, the system may define an array of micro-pixels for each color channel of RGB and each micro-pixel of each color channel may correspond to a color component of a corresponding optimized image pixel value. For example, for the red image pixel component array, each red image pixel component $x_r(i,j)$ may be mapped to a corresponding unconstrained micro-pixel of the red color channel. Similarly, for the green image pixel component array, each green image pixel component $x_g(i,j)$ may be mapped to a corresponding unconstrained micro-pixel of the green color channel. Similarly, for the blue image pixel component array, each blue image pixel component $x_b(i,j)$ may be mapped to a corresponding unconstrained micro-pixel of the blue color channel. It is notable that the image pixel values including RGB color components, that are mapped to the micro-pixel array, may be the optimized image pixels that are determined based on the optimization filters and the corresponding original image pixel values. Then, the system may determine the target color values for the subpixels of R and B color channels by applying the subpixel constraints as described by Equations (7) and (8) to the corresponding optimized image pixel color components. The target color values for the subpixels of G color channel may be directed determined based on the corresponding green components of the optimized image pixel values because the micro-pixel array and the actual subpixel array of the G color channel has a one-to-one mapping relationship.

In particular embodiments, the subpixel geometry may be encoded in the objective function (e.g., Equation (1)) with a constraint matrix (S). In particular embodiments, the equality constraints may be imposed on each color channel of each panel ($S^{c\in\{r,g,b\}}$) at the locations of interest to form a certain subpixel pattern. Therefore, $S\tilde{x}$ may be represented as matrix-vector multiplication, where the block diagonal matrix S may have diagonal entries $S^r$, $S^g$, $S^b$ and vectorized $\tilde{x}$ contains $\tilde{x}^r$, $\tilde{x}^g$, and $\tilde{x}^b$. In Equation (1), the geometry constrained display pixels may be represented a matrix-vector multiplication format $S\tilde{x}$, where S is expressed as a block diagonal matrix containing $S^{c\in\{r,g,b\}}$. Each $S^{c\in\{r,g,b\}}$ matrix may be a block diagonal matrix by itself and, with a N×N display screen, contains a total of $N/w^c$ sub-matrix blocks $s^{c\in\{r,g,b\}}$ at the diagonal entries. For example, the overall constraint matrix for RGB color channels may be described by the following equation:

$$S\tilde{x} = \begin{bmatrix} S^r & & \\ & S^g & \\ & & S^b \end{bmatrix} \begin{bmatrix} \tilde{x}^r \\ \tilde{x}^g \\ \tilde{x}^b \end{bmatrix}, \text{ where } S^{c\in\{r,g,b\}} = \begin{bmatrix} s^c & & \\ & \ddots & \\ & & s^c \end{bmatrix}_{\frac{N}{w^c} \times \frac{N}{w^c}} \quad (11)$$

Each submatrix $s^{c\in\{r,g,b\}}$ may be a sparse block circulant matrix made of $w^c \times w^c$ blocks of $U^c$, which can be further decomposed to a block diagonal matrix made of $N/h^c$ unity matrix $J_{h^c \times h^c}$ (size $$h^c \times h^c, k = 1, 2 \ldots \frac{N}{h^c}$$

indicates the k-th subpixel in row). For example, the target subpixel values for RGB color channels may be determined using the following equation:

$$s^{c\in\{r,g,b\}} = \frac{1}{a^c} \begin{bmatrix} U^c & \cdots & U^c \\ \vdots & \ddots & \vdots \\ U^c & \cdots & U^c \end{bmatrix}_{w^c \times w^c}, \quad (12)$$

$$\text{where } U^c = \begin{bmatrix} J^{(1)}_{h^c \times h^c} & & \\ & \ddots & \\ & & J^{(N/h^c)}_{h^c \times h^c} \end{bmatrix}$$

It is notable that the constraint matrix $s^{c\in\{r,g,b\}}$ may be a matrix with the dimension of $w^c \times w^c$.

Figure 7:
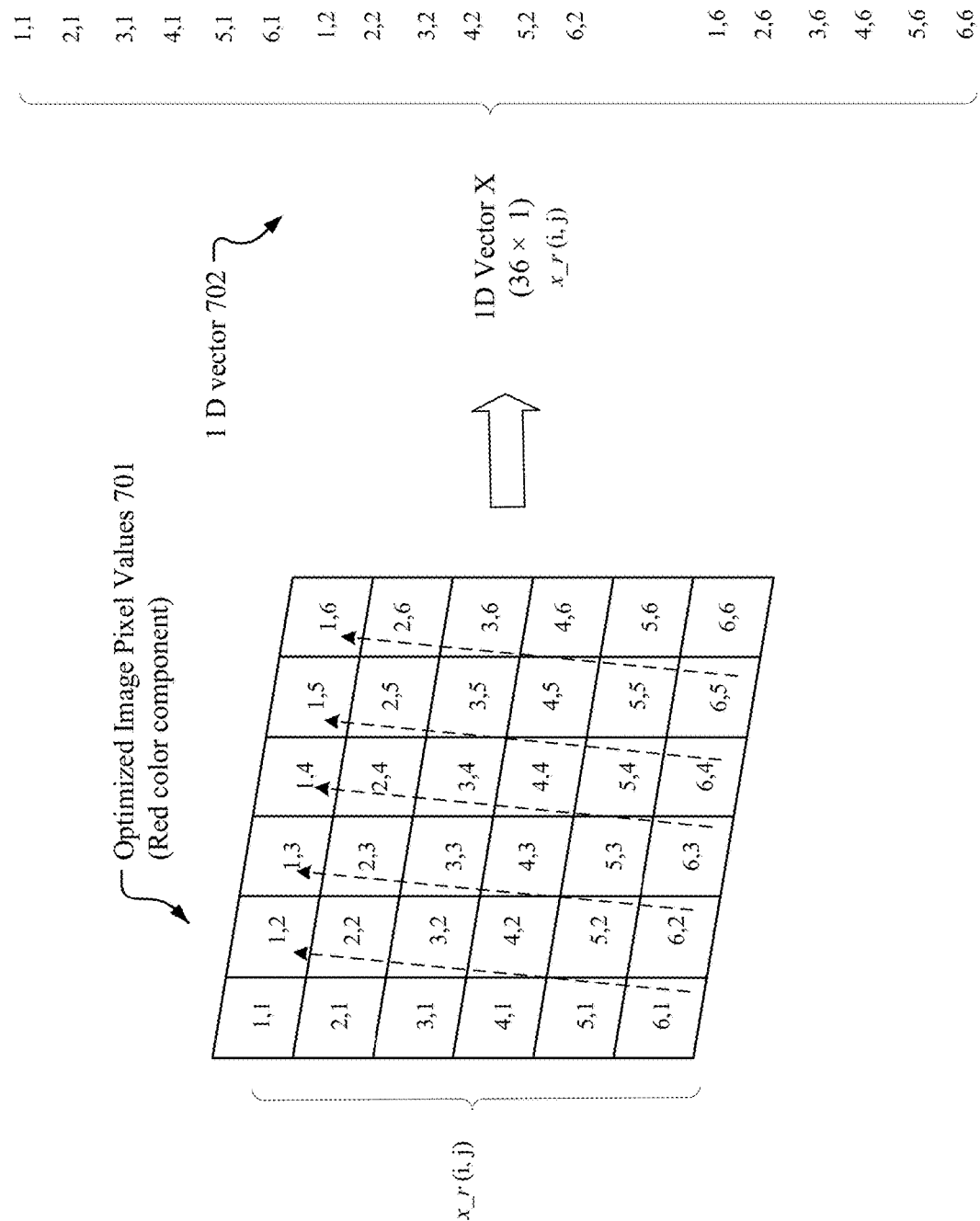
FIG. 7 illustrates an example linearization process to transform optimized image pixel values to one-dimension vector.

FIG. 7 illustrates an example linearization process 700 to transform optimized image pixel values 521 to one-dimension vector 522. In particular embodiments, the system may use a linearization process 700 to convert the optimized image pixel values 701 contained in a 2D array into a 1D vector 702. As an example and not by way of limitation, the red color components of the optimized image pixel values 701 of an image to be displayed may be organized into a 2D array as shown in FIG. 7, where each grid (i,j) may represent a red color component value of an optimized image pixel value $x_{r(i,j)}$. The system may generate the 1D vector 702 by stacking each column of the red color components of the optimized image pixel values in the 2D array one column after another. For example, the first column of the red color components of the optimized image pixel values may be on the top of the 1D vector. The second column of the red color components of the optimized image pixel values may be directly below the first column of the optimized image pixel values, and so on. As a result, the system may generate a 1D vector which includes the red color components of all the optimized image pixel values 701 in the original 2D array. For example, for a 2D array having a dimension of 6×6, the 1D vector may have a dimension of 36×1, as shown in FIG. 7. It is notable that the 1D vector 702 is for red color channel only because the optimized image pixel values 701 in the 2D array are red component values of the image pixel values. The system may determine a 1D vector for each color channel based on the corresponding color component values of the optimized image pixel values. It is notable that, in particular embodiments, the linearization module and the linearization step may be optional. The linearization module and the linearization step may be needed when the system expresses the problem in matrix-vector form. The linearization module may not be needed when the system expresses the problem in 2D matrix directly. In particular embodiments, the convolution filters may always be 2D matrixes because the images that are processed and displayed are 2D.

FIG. 8A illustrates an example constraint matrix 820 for the red color channel with 2×3 subpixel layout. As an example and not by way of limitation, for the 6×6 display screen made of R/G/B subpixels with sizes 2×3/1×1/3×2 as shown in FIGS. 6A-6C, the constraint matrix $S^r$ for the red color channel may have a dimension of 6×6 and may be determined by the following equation:

$$S^r = \begin{bmatrix} s^r & \\ & s^r \end{bmatrix}, \text{ where } s^r = \frac{1}{6}\begin{bmatrix} U^r & U^r & U^r \\ U^r & U^r & U^r \\ U^r & U^r & U^r \end{bmatrix} \text{ and} \quad (13)$$

$$U^r = \begin{bmatrix} 1 & 1 & & & & \\ 1 & 1 & & & & \\ & & 1 & 1 & & \\ & & 1 & 1 & & \\ & & & & 1 & 1 \\ & & & & 1 & 1 \end{bmatrix}$$

The system may first determine the submatrix $U^r$ 811 using numerical pattern as defined in Equation (13). Then, the system may determine the intermediate matrix $s^r$ 812 by stacking $U^r$ into a 3×3 matrix as divided by 6. Then, the system may determine the constraint matrix $S^r$ 820 for the red color channel based on the intermediate matrix $s^r$. The constraint matrix $S^r$ 820 for the red color channel may have a dimension 36×36.

In particular embodiments, the system may use the red color channel constraint matrix 820 to determine the target color values for the red micropixels and then subpixels based on the 1D vector containing the red component values of the image pixel values. For example, the system may perform a convolution operation by convoluting the constraint matrix $S^r$ 820 by the 1D vector 702 (as shown in FIG. 7) to determine the target color values. Referring to the red subpixel layout 600A (as re-illustrated in FIG. 8A) and the 1D vector as shown in FIG. 7, the target red color value corresponding to the micro-pixel (1,1) may be determined to be $$\frac{1}{6}(x_{r(1,1)} + x_{r(2,1)} + x_{r(1,2)} + x_{r(2,2)} + x_{r(1,3)} + x_{r(2,3)})$$

based on the first row of the constraint matrix 820 and the 1D vector 702. Similarly, the target red color value corresponding to the micro-pixel (2,1) may be determined to be the same to the micro-pixel (1,1) as $$\frac{1}{6}(x_{r(1,1)} + x_{r(2,1)} + x_{r(1,2)} + x_{r(2,2)} + x_{r(1,3)} + x_{r(2,3)})$$

based on the second row of the constraint matrix 820 and the 1D vector 702. It is notable that target color values for all micro-pixels within the red subpixel 611A may share the same color value. Similarly, the target red color value corresponding to the micro-pixel (3,1) may be determined to be $$\frac{1}{6}(x_{r(3,1)} + x_{r(4,1)} + x_{r(3,2)} + x_{r(4,2)} + x_{r(3,3)} + x_{r(4,3)})$$

based on the third row of the constraint matrix 820 and the 1D vector 702. Similarly, the target pixel red color value corresponding to the micro-pixel (4,1) may be determined to be the same to the micro-pixel (3,1) as $$\frac{1}{6}(x_{r(3,1)} + x_{r(4,1)} + x_{r(3,2)} + x_{r(4,2)} + x_{r(3,3)} + x_{r(4,3)})$$

based on the fourth row of the constraint matrix 820 and the 1D vector 702. It is notable that target color values for all micro-pixels within the red subpixel 617A may share the same color value.

Figure 8B:
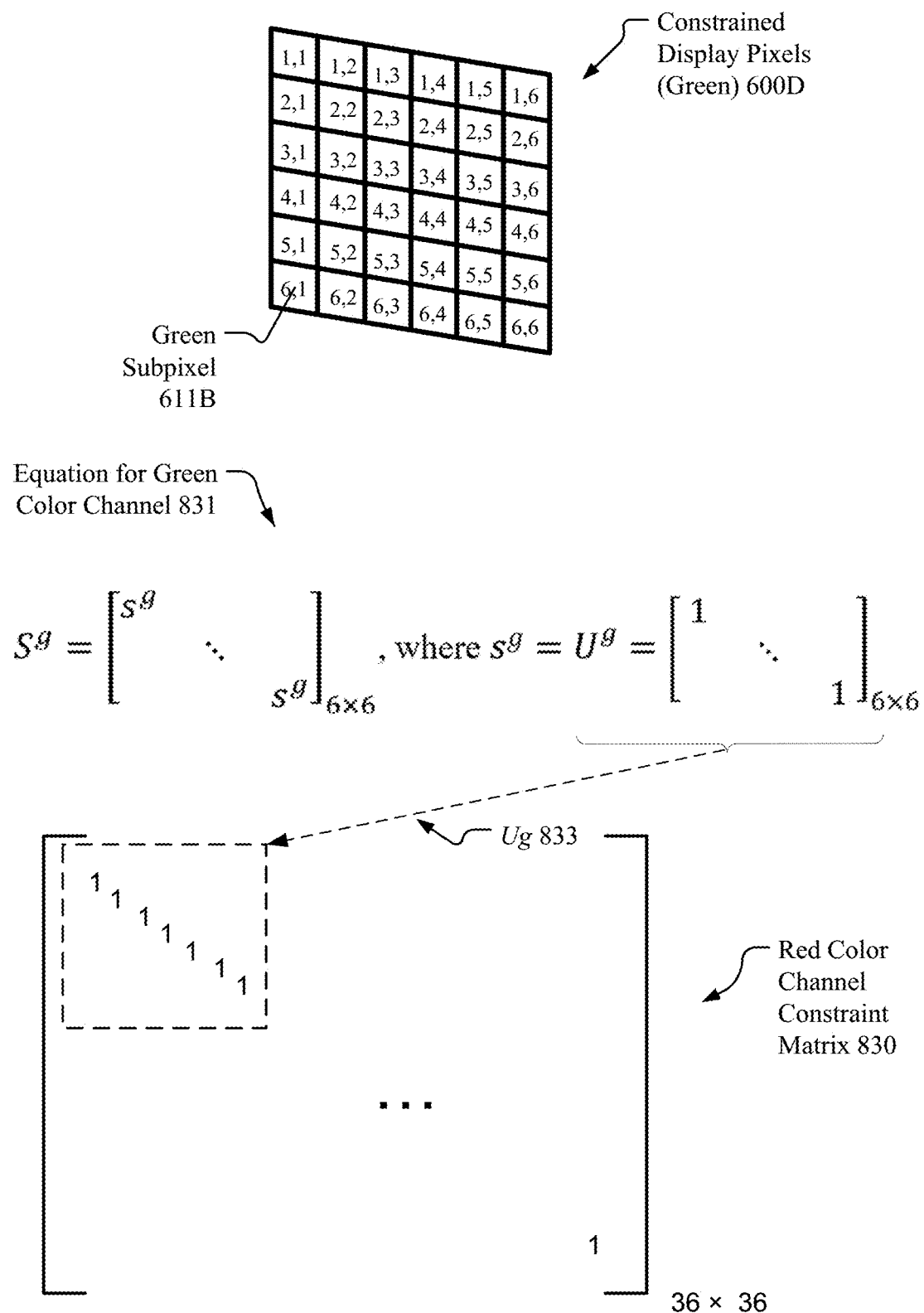
FIG. 8B illustrates an example constraint matrix for the green color channel with 1×1 subpixel layout.

FIG. 8B illustrates an example constraint matrix 830 for the green color channel with 1×1 subpixel layout. As an example and not by way of limitation, for the 6×6 display screen made of R/G/B subpixels with sizes 2×3/1×1/3×2 as shown in FIGS. 6A-6C, the constraint matrix $S^g$ for the green color channel may have dimension of 6×6 and may be determined by the following equation:

$$S^g = \begin{bmatrix} s^g & \\ & \ddots & \\ & & s^g \end{bmatrix}_{6\times 6}, \text{ where } s^g = U^g = \begin{bmatrix} 1 & \\ & \ddots & \\ & & 1 \end{bmatrix}_{6\times 6} \quad (14)$$

In particular embodiments, the system may use the green color channel constraint matrix 830 to determine the target color values for the green subpixels based on the 1D vector containing the green component values of the image pixel values. For example, the system may perform a convolution operation by convoluting the constraint matrix $S^g$ 830 by the 1D vector for the green color channel. For example, the target green color value corresponding to the micro-pixel (1,1) may be determined to be $x_{g(1,1)}$ based on the first row of the constraint matrix 830 and the 1D vector for green color channel. Similarly, the target green color value corresponding to the micro-pixel (2,1) may be determined to be $x_{g(1,2)}$ based on the second row of the constraint matrix 830 and the 1D vector for the green color channel. It is notable that because the green subpixel has the same size to the micro-pixel corresponding to the basic unit size, the green color value for each green subpixel may be directly equal to the corresponding the green color components of the optimized image pixel values.

Figure 8C:
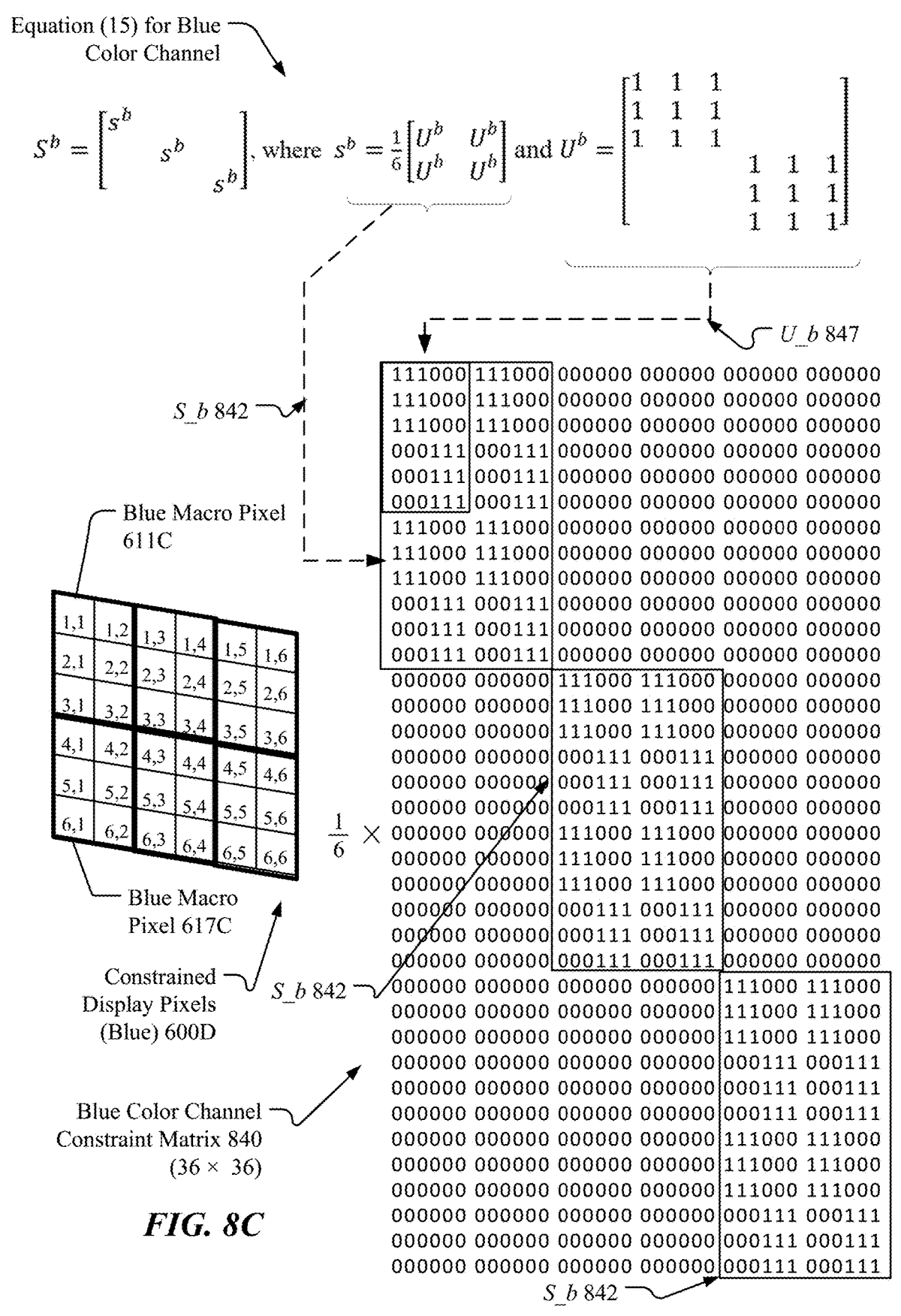

FIG. 8C illustrates an example constraint matrix 840 for the blue color channel with 3×2 subpixel layout. As an example and not by way of limitation, for the 6×6 display screen made of R/G/B subpixels with sizes 2×3/1×1/3×2 as shown in FIGS. 6A-6C, the constraint matrix $S^b$ for the blue color channel may have a dimension of 6×6 and may be determined by the following equation:

$$S^b = \begin{bmatrix} s^b & & \\ & s^b & \\ & & s^b \end{bmatrix}, \text{where } s^b = \frac{1}{6}\begin{bmatrix} U^b & U^b \\ U^b & U^b \end{bmatrix} \text{and} \quad (15)$$

$$U^b = \begin{bmatrix} 1 & 1 & 1 & & & \\ 1 & 1 & 1 & & & \\ 1 & 1 & 1 & & & \\ & & & 1 & 1 & 1 \\ & & & 1 & 1 & 1 \\ & & & 1 & 1 & 1 \end{bmatrix}$$

In particular embodiments, the system may use the blue color channel constraint matrix 840 to determine the target color values for the blue subpixels based on the 1D vector containing the blue component values of the image pixel values. For example, the system may perform a convolution operation by convoluting the constraint matrix $S^b$ 840 by the 1D vector of the blue color channel to determine the target color values. For example, the target blue color value corresponding to the micro-pixel (1,1) may be determined to be $$\frac{1}{6}(x_{b(1,1)} + x_{b(1,2)} + x_{b(2,1)} + x_{b(2,2)} + x_{b(3,1)} + x_{b(3,2)})$$

based on the first row of the constraint matrix 840 and the 1D vector for the blue color channel. Similarly, the target blue color value corresponding to the micro-pixel (2,1) may be determined to be the same to the micro-pixel (1,1) as $$\frac{1}{6}(x_{b(1,1)} + x_{b(1,2)} + x_{b(2,1)} + x_{b(2,2)} + x_{b(3,1)} + x_{b(3,2)})$$

based on the second row of the constraint matrix 840 and the 1D vector for blue color channel. It is notable that target color values for all micro-pixels within the blue subpixel 611C may share the same color value. Similarly, the target blue color value corresponding to the micro-pixel (4,1) may be determined to be $$\frac{1}{6}(x_{b(4,1)} + x_{b(4,2)} + x_{b(5,1)} + x_{b(5,2)} + x_{b(6,1)} + x_{b(6,2)})$$

based on the fourth row of the constraint matrix 840 and the 1D vector for blue color channel. Similarly, the target blue color value corresponding to the micro-pixel (5,1) may be determined to be the same to the micro-pixel (4,1) as $$\frac{1}{6}(x_{b(4,1)} + x_{b(4,2)} + x_{b(5,1)} + x_{b(5,2)} + x_{b(6,1)} + x_{b(6,2)})$$

based on the fifth row of the constraint matrix 840 and the 1D vector for the blue color channel. It is notable that target color values for all micro-pixels within the blue subpixel 617C may share the same color value.

Figure 9:
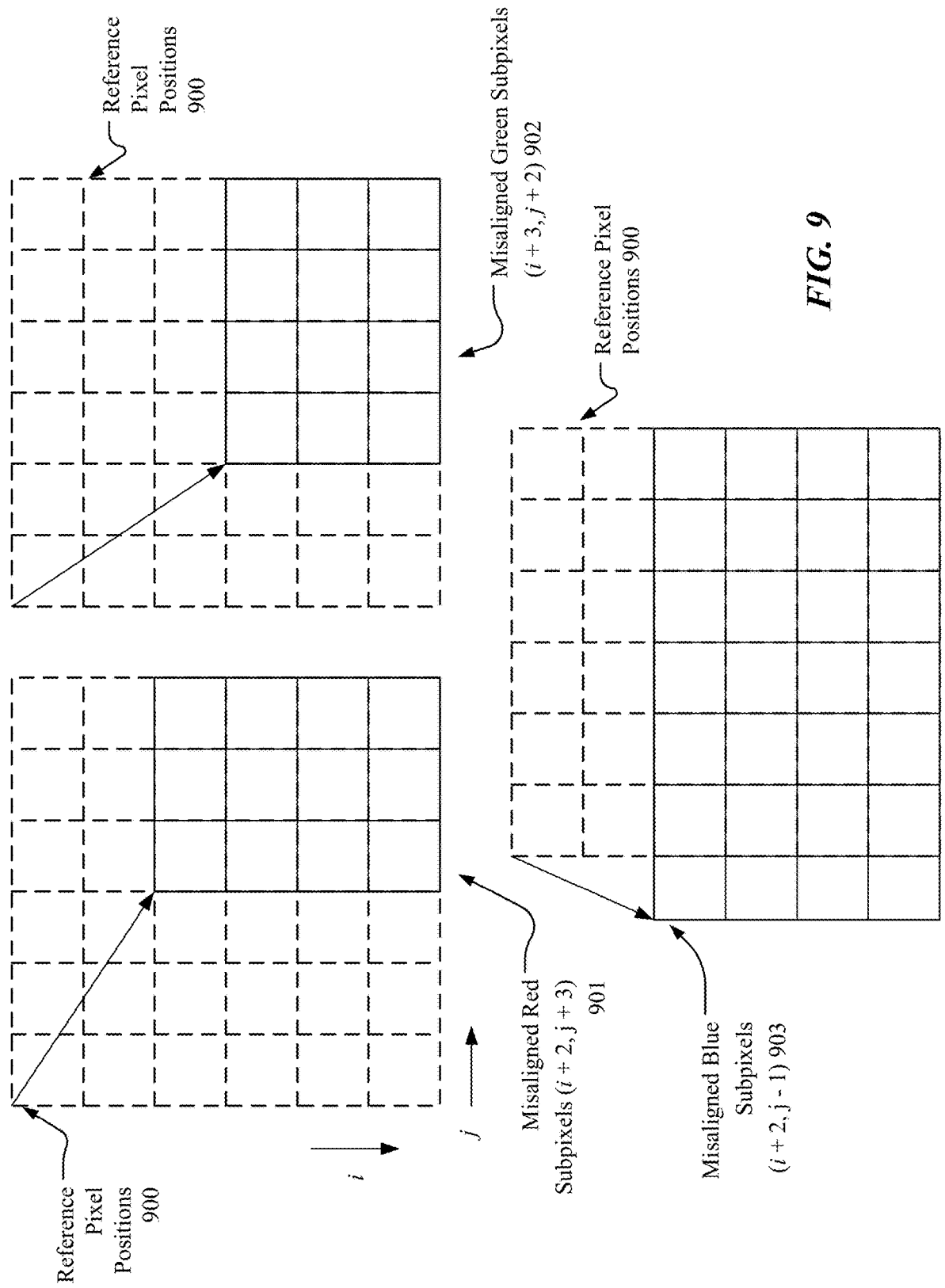
FIG. 9 illustrates example subpixel layouts of RGB color channels with misalignments.

FIG. 9 illustrates example subpixel layouts (e.g., 901, 902, and 903) of RGB color channels with misalignments. In particular embodiment, the display subpixels of the different color channels may be included in different display panels that are misaligned to each other due to manufacture defect. In addition to the artifacts caused by the difference between subpixel sizes, shapes, and layouts, the displayed image may have artifacts caused by this misalignment of display panels. As an example and not by way of limitation, the red subpixel array may be misaligned with an offset of (i+2,j+3), where i is the row number of the red subpixels and j is the column number of the red subpixels. The green subpixel array may be misaligned with an offset of (i+3,j+2), where i is the row number of the green subpixels and j is the column number of the green subpixels. The blue subpixel array may be misaligned with an offset of (i+2,j−1), where i is the row number of the blue subpixels and j is the column number of the blue subpixels. As a result, the display image may have artifacts caused by these misalignments of display panels. It is notable that the misalignment of the display panels as shown in FIG. 9 are for example purpose only and the misalignments are not limited thereto. For example, the misalignment offsets between the display panels may be any arbitrary distances and may be along any suitable directions.

To mitigate these artifacts, the system may generate the constraint matrix according to the magnitudes and directions of these misalignments. For example, the constraint matrix for each particular color channel may specify the offset of the misalignment and may have shifted positions for its element values according to the magnitude and direction of the misalignment of that particular color channel. As a result, the constraint matrix once applied to the optimized pixel values may correctly map those optimized pixel values to the correct position of that display panel. It is notable that the constraint matrixes may be generated based on all factors including subpixel sizes, shapes, layouts, and the misalignment offsets at the same time. Such constraint matrixes may allow the system to correct the artifact caused by the subpixel difference and misalignment all at once.

In particular embodiments, the AR/VR system may display different color channels of an image sequentially in time. That works fine when the user's eye is stationary. However, when the user's eye moves while different color channels are being displayed sequentially in time, it may cause a temporal misalignment between different color channels and result in artifacts in the displayed image. To mitigate these artifacts, the system may generate the constraint matrix according to the magnitude and direction of the temporal misalignment caused by eye motion to specify the misalignment offsets. The constraint matrix may allow the system to correctly map the optimized pixel values to the correct positions of that particular display channel. As a result, the displayed image may eliminate or reduce the artifacts caused by these temporal misalignments. It is notable that for the panel misalignment caused by misalignment of different panels, the system may pre-computer the optimization filters and the constraint matrixes and apply them at run time. For the color-breakup of sequentially displayed panels caused by the eye moving, the system may dynamically use eye-tracking predictions to define a dynamic constraint and generate an optimization filters in real-time because the optimization filters may be constantly changing (in contrast to the fixed optimization filter for misalignment of the multiple physical panels).

In particular embodiments, to mitigate the artifacts caused by the difference between the subpixels, the system may use the constrained rendering framework to render the images. In particular embodiments, the constrained rendering framework used for the single-panel display may be similar to the constrained rendering framework used for the multi-panel display but using different constrain matrix. The system may determine an optimization filter that can be used to calculate the optimized pixel values based on the original image pixel values. Each optimized pixel value may be associated with a particular color channel and may depend on corresponding original pixel values of all three color channels. The optimization filter values in the optimization filter may be optimized during a filter optimization process. The optimization filter with the optimized filter values may allow the displayed images to have minimum mean-squared error (MSE) in the opponent color space as perceived by the user. In particular embodiments, after the system has determined the optimization filter values and the constraint matrixes, the system may generate an overall optimization and constraint filter or matrix which incorporates both the optimization filter and the constraint matrix (and other intermediate matrixes if applicable). At run time, the system may access image pixel values from an image to be displayed and then apply the optimization and constraint filter to the image pixel values to determine the target color values. Then, the system may output the target color values to the display. As a result, the displayed image as represented by the target color values may have minimized mean-squared error (MSE) in the opponent color space as perceived by the user.

In particular embodiments, the filter optimization process for single-panel display may be similar to the filter optimization process for the multi-panel display. In particular embodiments, the system may determine original image pixel values by accessing the pixel values of an image to be displayed. Then, the system may apply the optimization filter with the initial or current filter values to the original image pixel values and determine optimized pixel values (each including RGB color component values). After that, the system may generate a 1D vector including color component values of a particular color of all the optimized pixel values based a linearization operation. The 1D vector may include all color component values of a particular color of all the optimized image pixel values that re-organized into a 1D vector. Then, the system may apply the constraint matrix as determined based on the subpixel layout to the 1D vector to determine the target color values. The system may use the constraint matrix to determine the target color values (e.g., by mapping and averaging the color component values of the optimized pixel values to the display subpixels). In particular embodiments, for single-panel color matrix display, the constraint matrix may be for a particular color channel and may be generated based on the sizes, shapes, or/and layouts of subpixels of that particular color channel. The subpixels of different color channels may have different sizes and layouts. Then, the system may compare the target color values to the original image pixel value and convert the comparison results from RGB color space into opponent color space using a Fourier transform function, an opponent color space transform function, and a 2D contrast sensitivity function (CSF). Then, the system may determine mean-squared error (MSE) and feed that information to the optimization process to determine the adjusted filter values to minimize the mean-squared error (MSE). The adjusted filter values may allow the system to minimize the mean-squared error (IVIES) for the displayed image as perceived by users. Then, the system may send the adjusted filter values to the optimization filter to update the filter values.

FIG. 10A illustrates an example subpixel layout 1000A for a single-panel display. In particular embodiments, the AV/VR system may use a single-panel display with the display subpixels having an arbitrary subpixel layout. In contrast to the multi-panel display where the subpixels of RGB color channels are included in separate display panels, the subpixels of the single-panel display may be included in the same display panel and therefore may be arranged on the same 2D surface. As an example and not by way of limitation, a single-panel display may have subpixel layout 1000A as shown in FIG. 10A. In this example, the display pixel 1001 of the single-panel display may include two red subpixels (e.g., 1001A and 1001B) arranged at the diagonal positions, two blue subpixels (e.g., 1002A and 1002B) arranged at the diagonal positions, and a green subpixel in the middle part of the display pixel 1001. In this example, the red subpixels 1003A and 1003B may be rectangular and may have the same shape and size. Similarly, the blue subpixels 1002A and 1002B may be rectangular and may have the same shape and size. The green subpixels 1007 may have a different rectangular shape with respect to the red subpixels and the blue subpixels. The difference between the green subpixels 1007 and the red and blue subpixels (e.g., 1003A-B and 1002A-B) may cause the displayed image to have artifacts.

FIG. 10B illustrates an example process 100B for dividing the subpixels of RGB into basic unit sizes corresponding to micro-pixels. In particular embodiments, the system may define a basic unit size as a "micro-pixel," where the basic unit size could be the greatest size by which the subpixels of RGB color channels can be exactly divided without remainder. As an example and not by way of limitation, for the example subpixel layout as shown in FIG. 10A, the system may define the micro-pixel as half of the green subpixel 1007 because by which all subpixels of RGB color channels can be exactly divided without remainder. The system may divide the subpixels of RGB into micro-pixels as shown in FIG. 10B. As a result, the system may determine an array of micro-pixels of different color channels, including micro-pixels of (1, 1), (1, 2), (2, 4), and (2, 5) for red color channel, micro-pixels of (1, 4), (1, 5), (2, 1), and (2, 2) for blue color channel, and micro-pixels of (1, 3) and (2, 3) for green color channel. Then, the system may determine the constraint matrix for each color channel and use the constraint matrixes to determine the target color values as discussed below.

FIGS. 10C-10E illustrate example constraint matrixes (e.g., 1005, 1012, and 1022) for the RGB subpixels of the display pixel. As an example and not by way of limitation, the system may determine a constraint matrix for the red color channel 1005 based on the layout of the red subpixels as divided into the micro-pixels. Then, the system may determine the red subpixel values 1004 by convoluting the 1D vector 1006 for the red color channel to the constraint matrix 1005 for the red color channel, as shown in FIG. 10C. Similarly, the system may determine a constraint matrix 1012 for the green color channel based on the layout of the green subpixels as divided into the micro-pixels. Then, the system may determine the green subpixel values 1011 by convoluting the 1D vector 1013 for the green color channel to the constraint matrix 1012 for the green color channel. Similarly, the system may determine a constraint matrix 1022 for the blue color channel based on the layout of the blue subpixels as divided into the micro-pixels. Then, the system may determine the blue subpixel values 1021 by convoluting the 1D vector 1023 for the blue color channel to the constraint matrix 1022 for the green color channel.

It is notable that, as shown in FIG. 10C, using the constraint matrix 1005 for red color channel, the red subpixel values of for micro-pixels $x_r(1, 1)$ and $x_r(1, 2)$ may be determined to be equal to the red color component of the corresponding image pixel based on the first and second row of the constraint matrix 1005, respectively. Consequently, the subpixel value for the red subpixel 1003A may be determined to be equal to the red color component of the corresponding image pixel. Similarly, the red subpixel values for the micro-pixels of $x_r(2, 4)$ and $x_r(2, 5)$ may be determined to be equal to the red color component of the corresponding image pixel based on the ninth and tenth row of the constraint matrix 1005, respectively. Consequently, the subpixel value for the red subpixel 1003B may be determined to be equal to the red color component of the corresponding image pixel.

Similarly, as shown in FIG. 10D, the green subpixel values for the micro-pixels of $x_b(1, 3)$ and $x_b(2, 3)$ may be determined to be equal to the green color component of the corresponding image pixel based on the third and eighth row of the constraint matrix 1012, respectively. Consequently, the color value for the green micro-pixels of 1007 may be determined to be equal to the green color component of the corresponding image pixel. Similarly, as shown in FIG. 10E, the blue subpixel values for the micro-pixels of $x_r(1, 4)$ and $x_r(1, 5)$ may be determined to be equal to the blue color component of the corresponding image pixel based on the fourth and fifth row of the constraint matrix 1022, respectively. Consequently, the subpixel value for the blue subpixel 1002B may be determined to be equal to the blue color component of the corresponding image pixel. Similarly, as shown in FIG. 10E, the blue subpixel values for the micro-pixels of $x_r(2, 1)$ and $x_r(2, 2)$ may be determined to be equal to the blue color component of the corresponding image pixel based on the sixth and seventh row of the constraint matrix 1022, respectively. Consequently, the subpixel value for the blue subpixel 1002A may be determined to be equal to the blue color component of the corresponding image pixel.

It is notable that, because the display pixel of single-panel display may include RGB subpixels (as shown in FIG. 10A), the display pixel itself may correspond to an image pixel including RGB color components and there may be not need to define a higher-level macro-pixel concept for the single-panel display. Because a display pixel of the single-panel display may correspond to a single image pixel which include a color component value for each color channel of RGB, the system may determine the 1D vector for each color channel by repudiating the same color component value of that color channel. For example, for the red color channel, the system may generate the 1D vector (e.g., vector 1006 in FIG. 10C) by repudiating the red color component value $(x_r)$ of the corresponding image pixel. Similarly, for the green color channel, the system may generate the 1D vector (e.g., vector 1013 in FIG. 10D) by repudiating the green color component value $(x_g)$ of the corresponding image pixel. Similarly, for the blue color channel, the system may generate the 1D vector (e.g., vector 1023 in FIG. 10E) by repudiating the blue color component value $(x_b)$ of the corresponding image pixel.

It is notable that the color component values used in generating the 1D vector for RGB color channels may be the optimized pixel values that are generated by applying the optimization filters to the image pixel values (rather than the original image pixel values). During the filter generating and optimization process, the system may apply the optimization filters with the initial or current filter values to the original image pixels to determine the optimized pixel values. Then, the system may generate the 1D vectors for RGB color channels for each image pixel by repudiating the color component value of that image pixel. Then, the system may generate the constraint matrixes for RGB color channels based on the RGB subpixel layouts as divided by the micro-pixels. After that, the system may apply the constraint matrixes to the 1D vectors to determine the target color values for the RGB subpixels. It is notable that, in particular embodiments, the linearization module and the linearization step may be optional. The linearization module and the linearization step may be needed when the system expresses the problem in matrix-vector form. The linearization module may not be needed when the system expresses the problem in 2D matrix directly. In particular embodiments, the convolution filters may always be 2D matrixes because the images that are processed and displayed are 2D.

Figure 11:
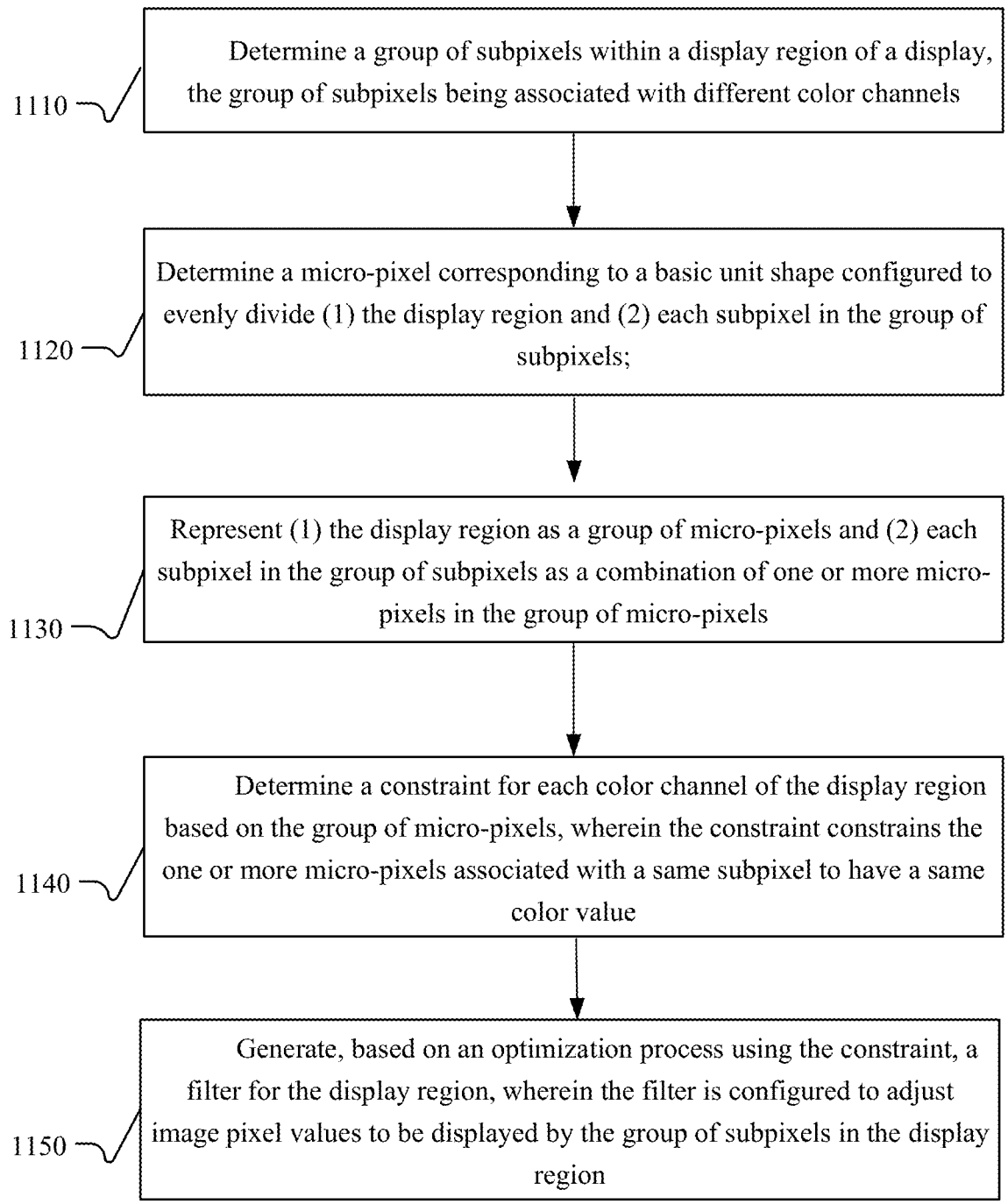
FIG. 11 illustrates an example method for determining an optimization filter for constrained rendering.

FIG. 11 illustrates an example method 1100 for determining an optimization filter for constrained rendering. The method may begin at step 1100, where a computing system may determine a group of subpixels within a display region of a display. The group of subpixels may be associated with different color channels. At step 1120, the system may determine a micro-pixel corresponding to a basic unit shape configured to evenly divide (1) the display region and (2) each subpixel in the group of subpixels. At step 1130, the system may represent (1) the display region as a group of micro-pixels and (2) each subpixel in the group of subpixels as a combination of one or more micro-pixels in the group of micro-pixels. At step 1140, the system may determine a constraint for each color channel of the display region based on the group of micro-pixels. The constraint may constrain the one or more micro-pixels associated with a same subpixel to have a same color value. At step 1150, the system may generate, based on an optimization process using the constraint, a filter for the display region. The filter may be configured to adjust image pixel values to be displayed by the group of subpixels in the display region.

In particular embodiments, each subpixel of the group of subpixels within the display region may be entirely within the display region. In particular embodiments, the filter may be optimized to minimize a perceived error of the image in an opponent color space once the image is displayed on the display. In particular embodiments, the display may have multiple color matrix panels. The multiple color matrix panels may have different subpixel layouts. The constraint may be determined based on a subpixel layout associated with that color channel of the display region. In particular embodiments, a first dimension associated with first subpixels of a first color channel may be different from a second dimension associated with second subpixels of a second color channel. In particular embodiments, the first dimension and the second dimension may be associated with a subpixel size, a subpixel shape, a subpixel distance, a subpixel position, a subpixel angle, or a subpixel layout.

In particular embodiments, the system may generate, for each color channel, an optimization and constraint filter based on the filter generated based on the optimization process and using the constraint. In particular embodiments, the system may access an array of image pixel values from the image to be displayed on the display. The system may determine an array of target color values by applying the optimization and constraint filter to the array of image pixel values. The system may output the array of target color values to the display. In particular embodiments, the image as displayed based on the array of target color values may have a minimum perceived error in the opponent color space. In particular embodiments, the filter may be optimized during the optimization process based at least on an opponent space function, a Fourier transform function, or a 2D contrast sensitivity function (CSF) in an opponent color space. In particular embodiments, the display may have three display panels for three color channels and at least two display panels may be misaligned to each other.

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for determining an optimization filter for constrained rendering including the particular steps of the method of FIG. 11, this disclosure contemplates any suitable method for determining an optimization filter for constrained rendering including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Figure 12:
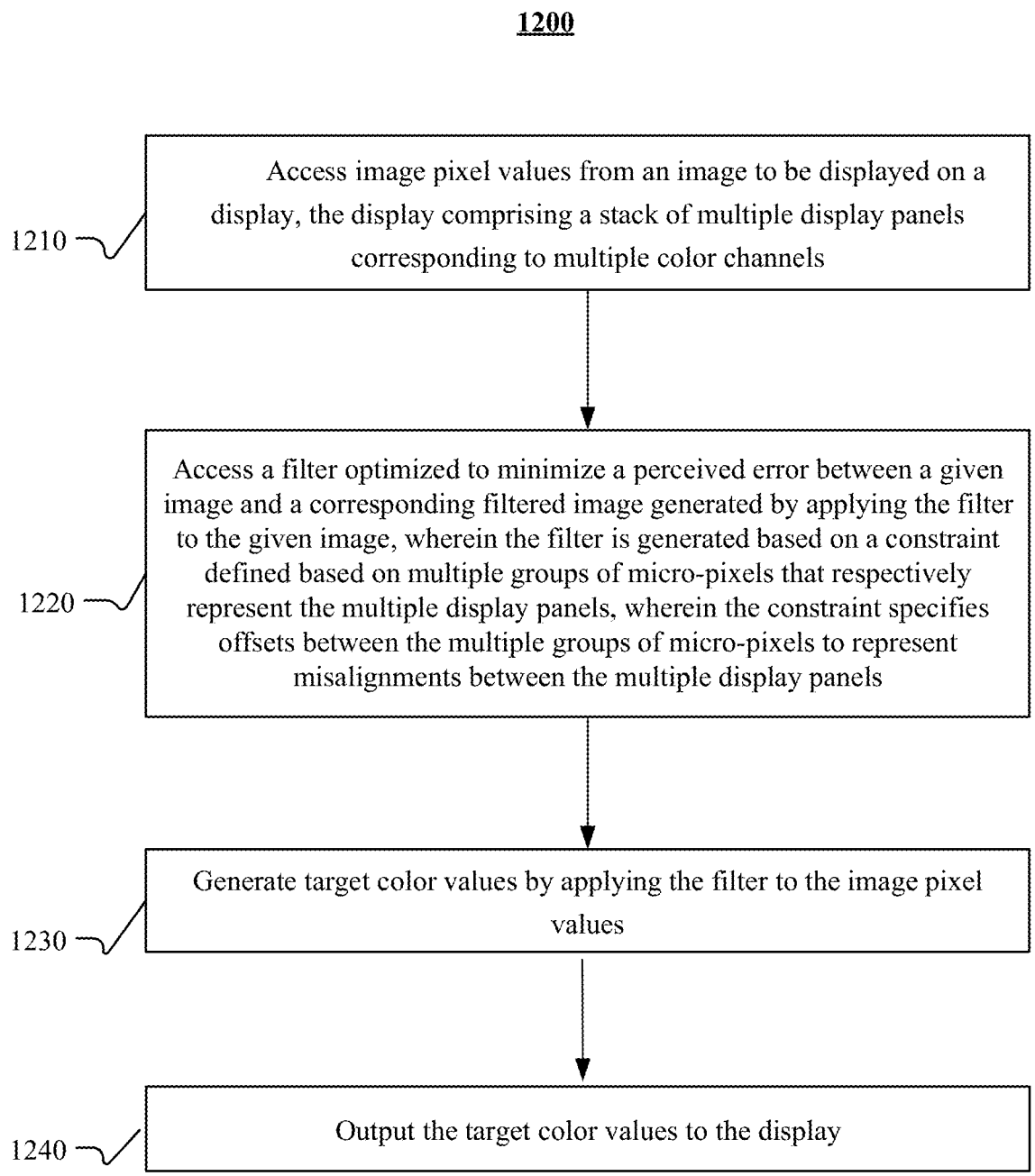
FIG. 12 illustrates an example method for displaying an image using constrained rendering.

FIG. 12 illustrates an example method 1200 for displaying an image using constrained rendering. The method may begin at step 1210, where a computing system may access image pixel values from an image to be displayed on a display. The display may have a stack of multiple display panels corresponding to multiple color channels. At step 1220, the system may access a filter optimized to minimize a perceived error between a given image and a corresponding filtered image generated by applying the filter to the given image. The filter may be generated based on a constraint defined based on multiple groups of micro-pixels that respectively represent the multiple display panels. The constraint may specify offsets between the multiple groups of micro-pixels to represent misalignments between the multiple display panels. At step 1230, the system may generate target color values by applying the filter to the image pixel values. At step 1240, the system may output the target color values to the display.

In particular embodiments, each display panel of the stack of multiple display panels may have an array of subpixels associated with a particular color channel. Each micro-pixel may correspond to a basic unit size configured to evenly divide each subpixel of the array of subpixels. In particular embodiments, the stack of multiple display panels may have different subpixel layouts. A first dimension associated with first display subpixels of a first color channel may be different from a second dimension associated with second display subpixels of a second color channel. In particular embodiments, the first dimension and the second dimension may be associated with a subpixel size, a subpixel shape, a subpixel distance, a subpixel position, a subpixel angle, or a subpixel layout.

In particular embodiments, the stack of multiple display panels may be physical display panels. At least two display panels may be misaligned with respect to each other corresponding to the offsets specified by the constraint. In particular embodiments, the stack of multiple display panels may be virtual display panels corresponding to RGB color channels. The virtual display panels may be displayed sequentially in time to represent the RGB color channels. In particular embodiments, at least two display panels may be misaligned with respect to each other corresponding to the offsets specified by the constraint. The misalignments may be caused by a user eye motion. In particular embodiments, the filter and the constraint may be determined dynamically in real-time based on the user eye motion. In particular embodiments, the system may determine, during a filter optimization process, an array of optimized image pixel values based on the image pixel values accessed from the image. Each optimized image pixel value associated with a particular color channel may be determined based on associated image pixel values of three color channels. The target pixel color values may be generated based on the optimized image pixel values.

In particular embodiments, the constraint may be determined based on a subpixel layout associated with a subpixel size, a subpixel shape, a subpixel distance, a subpixel position, or a subpixel angle. In particular embodiments, the filter may be optimized based at least on an opponent space function, a Fourier transform function, a 2D contrast sensitivity function (CSF) in an opponent space, or a display transform function.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for displaying an image using constrained rendering including the particular steps of the method of FIG. 12, this disclosure contemplates any suitable method for displaying an image using constrained rendering including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
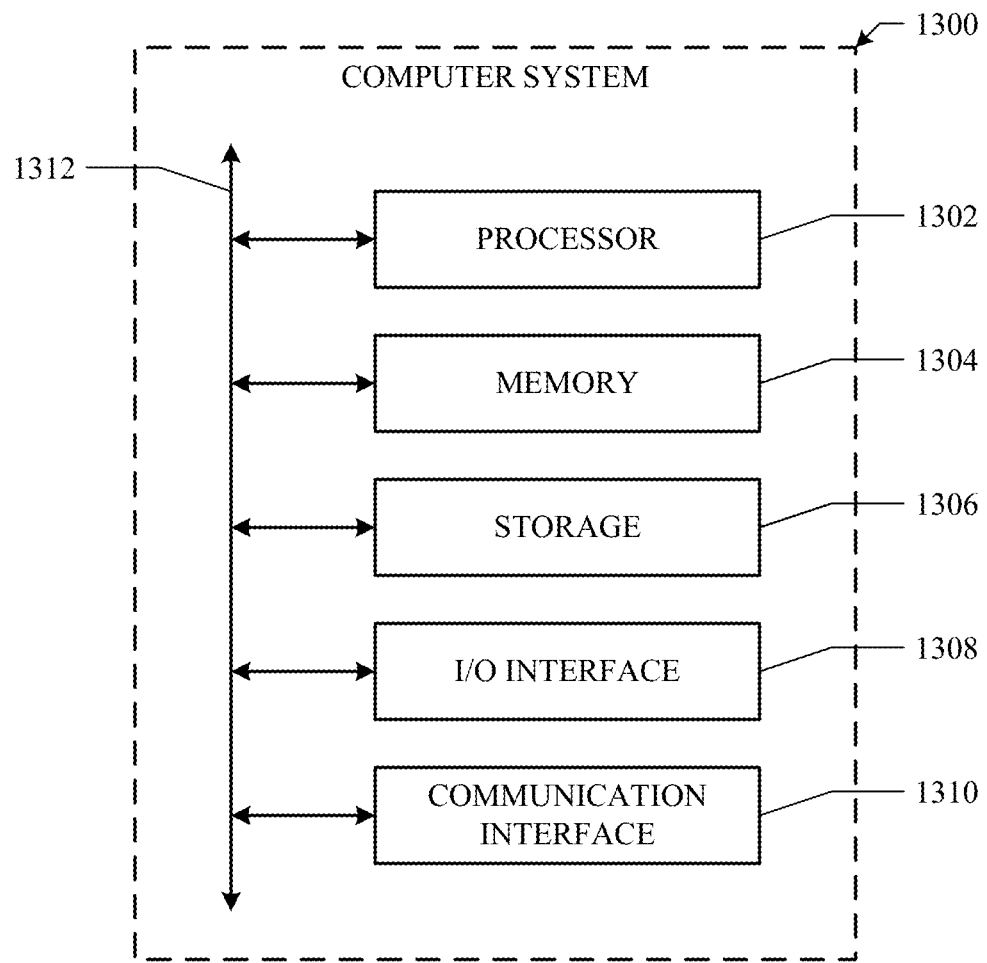
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    determining a group of subpixels within a display region of a display, the group of subpixels being associated with different color channels;
    determining a micro-pixel corresponding to a basic unit shape configured to evenly divide (1) the display region and (2) each subpixel in the group of subpixels;

representing (1) the display region as a group of micro-pixels and (2) each subpixel in the group of subpixels as a combination of one or more micro-pixels in the group of micro-pixels;

determining a constraint for each color channel of the display region based on the group of micro-pixels, wherein the constraint constrains the one or more micro-pixels associated with a same subpixel to have a same color value; and generating, based on an optimization process using the constraint, a filter for the display region, wherein the filter is configured to adjust image pixel values to be displayed by the group of subpixels in the display region.

2. The method of claim 1, wherein each subpixel of the group of subpixels within the display region is entirely within the display region.

3. The method of claim 1, wherein the filter is optimized to minimize a perceived error of the image in an opponent color space once the image is displayed on the display.

4. The method of claim 1, wherein the display has multiple color matrix panels, and wherein the multiple color matrix panels have different subpixel layouts, and wherein the constraint is determined based on a subpixel layout associated with that color channel of the display region.

5. The method of claim 4, wherein a first dimension associated with first subpixels of a first color channel is different from a second dimension associated with second subpixels of a second color channel.

6. The method of claim 5, wherein the first dimension and the second dimension are associated with a subpixel size, a subpixel shape, a subpixel distance, a subpixel position, a subpixel angle, or a subpixel layout.

7. The method of claim 1, further comprising:
generating, for each color channel, an optimization and constraint filter based on the filter generated based on the optimization process and using the constraint.

8. The method of claim 7, further comprising:
accessing an array of image pixel values from the image to be displayed on the display;
determining an array of target color values by applying the optimization and constraint filter to the array of image pixel values; and
outputting the array of target color values to the display.

9. The method of claim 7, wherein the image as displayed based on the array of target color values has a minimum perceived error in the opponent color space.

10. The method of claim 1, wherein the filter is optimized during the optimization process based at least on an opponent space function, a Fourier transform function, or a 2D contrast sensitivity function (CSF) in an opponent color space.

11. The method of claim 1, wherein the display has three display panels for three color channels, and wherein at least two display panels are misaligned to each other.

12. One or more computer-readable non-transitory storage media embodying software that is operable when executed to:
determine a group of subpixels within a display region of a display, the group of subpixels being associated with different color channels;
determine a micro-pixel corresponding to a basic unit shape configured to evenly divide (1) the display region and (2) each subpixel in the group of subpixels;

represent (1) the display region as a group of micro-pixels and (2) each subpixel in the group of subpixels as a combination of one or more micro-pixels in the group of micro-pixels;

determine a constraint for each color channel of the display region based on the group of micro-pixels, wherein the constraint constrains the one or more micro-pixels associated with a same subpixel to have a same color value; and generate, based on an optimization process using the constraint, a filter for the display region, wherein the filter is configured to adjust image pixel values to be displayed by the group of subpixels in the display region.

13. The media of claim 12, wherein each subpixel of the group of subpixels within the display region is entirely within the display region.

14. The media of claim 12, wherein the filter is optimized to minimize a perceived error of the image in an opponent color space once the image is displayed on the display.

15. The media of claim 12, wherein the display has multiple color matrix panels, and wherein the multiple color matrix panels have different subpixel layouts, and wherein the constraint is determined based on a subpixel layout associated with that color channel of the display region.

16. The media of claim 15, wherein a first dimension associated with first subpixels of a first color channel is different from a second dimension associated with second subpixels of a second color channel.

17. A system comprising:
one or more processors; and
one or more computer-readable non-transitory storage media coupled to one or more of the processors and comprising instructions operable when executed by one or more of the processors to cause the system to:
determine a group of subpixels within a display region of a display, the group of subpixels being associated with different color channels;
determine a micro-pixel corresponding to a basic unit shape configured to evenly divide (1) the display region and (2) each subpixel in the group of subpixels;
represent (1) the display region as a group of micro-pixels and (2) each subpixel in the group of subpixels as a combination of one or more micro-pixels in the group of micro-pixels;
determine a constraint for each color channel of the display region based on the group of micro-pixels, wherein the constraint constrains the one or more micro-pixels associated with a same subpixel to have a same color value; and
generate, based on an optimization process using the constraint, a filter for the display region, wherein the filter is configured to adjust image pixel values to be displayed by the group of subpixels in the display region.

18. The system of claim 17, wherein each subpixel of the group of subpixels within the display region is entirely within the display region.

19. The system of claim 17, wherein the filter is optimized to minimize a perceived error of the image in an opponent color space once the image is displayed on the display.

20. The system of claim 17, wherein the display has multiple color matrix panels, and wherein the multiple color matrix panels have different subpixel layouts, and wherein the constraint is determined based on a subpixel layout associated with that color channel of the display region.

* * * * *